United States Patent [19]

Krause et al.

[11] Patent Number: 4,617,638

[45] Date of Patent: Oct. 14, 1986

[54] METHOD AND SYSTEM FOR DETERMINING MASS TEMPERATURE IN A HOSTILE ENVIRONMENT

[75] Inventors: Richard H. Krause, Lansdale; Thomas J. Pfeiffer; Vincent V. Horvath, both of Bethlehem, all of Pa.

[73] Assignee: Bethlehem Steel Corporation, Bethlehem, Pa.

[21] Appl. No.: 616,520

[22] Filed: Jun. 1, 1984

Related U.S. Application Data

[63] Continuation-in-part of Ser. No. 328,775, Dec. 8, 1981, abandoned.

[51] Int. Cl.$^4$ .................. H03K 13/02; G01K 7/12
[52] U.S. Cl. .................. 364/557; 364/477; 201/1; 356/43; 202/151
[58] Field of Search .............. 364/557, 477, 501, 472, 364/473; 358/100, 101, 107, 113; 201/1; 202/151; 250/330, 334; 356/446, 43, 46; 73/1 F; 374/121, 126

[56] References Cited

U.S. PATENT DOCUMENTS

| | | | |
|---|---|---|---|
| 3,392,623 | 7/1968 | Walker et al. | 356/434 |
| 3,463,595 | 8/1969 | Blanc et al. | 356/432 |
| 3,556,947 | 9/1968 | Kumper | 187/9 R |
| 3,600,149 | 8/1971 | Chen et al. | 364/477 X |
| 3,607,660 | 9/1971 | Kumper | 201/1 |
| 3,693,025 | 9/1972 | Brunton | 250/340 |
| 3,982,110 | 9/1976 | Kawai | 364/139 |
| 4,003,803 | 1/1977 | Schmidt-Balve | 364/477 X |
| 4,131,914 | 12/1978 | Bricmont | 358/100 |
| 4,144,758 | 3/1979 | Roney | 374/126 |
| 4,246,641 | 1/1981 | Babil et al. | 364/477 X |
| 4,280,050 | 7/1981 | Callender et al. | 250/330 |
| 4,344,819 | 8/1982 | Gerdes, Jr. | 201/1 |
| 4,403,251 | 9/1983 | Domarenok et al. | 358/107 |

FOREIGN PATENT DOCUMENTS

| | | | |
|---|---|---|---|
| 0053227 | 6/1982 | European Pat. Off. | 201/1 |
| 2073408 | 10/1981 | United Kingdom | 201/1 |

Primary Examiner—Edward J. Wise
Attorney, Agent, or Firm—John J. Selko; William B. Noll

[57] ABSTRACT

Production-worthy method and system comprising two computer-based subsystems for determining temperature of an irradiant mass movable through process means in a hostile environment exemplified as coke guide and coke oven in a battery of ovens. System is usable in other industries such as at cement kilns and the like. First subsystem which is carried by a movable coke guide/door machine, includes one or more coke guide pyrometers arranged vertically, each with a sighting window monitor to detect optical errors, an onboard computerized and cooled electronics package for acquiring and processing temperature data and automatically detecting same for pyrometer drift and optical errors, and automatically correcting for these errors, and further including a plug-in portable terminal with a printer. The second subsystem stationed in a central office having a base computer package with various computation and storage capabilities including a CRT control terminal for operator interaction with the entire system, a line printer and a printer/plotter. Two-way data communication between the two subsystems is exemplified by a two-way radio link. Each subsystem logs both coke level data and coke vertical and horizontal temperature profile data and alarm messages. Tabular printouts of temperature and diagnostic data are provided by both the portable terminal printer in the onboard subsystem and the base computer printers. Graphical displays are also provided by the base computer system of coke level, temperature and summary data, oven push schedules and/or self-diagnostic messages of various process and measurement operations.

10 Claims, 44 Drawing Figures

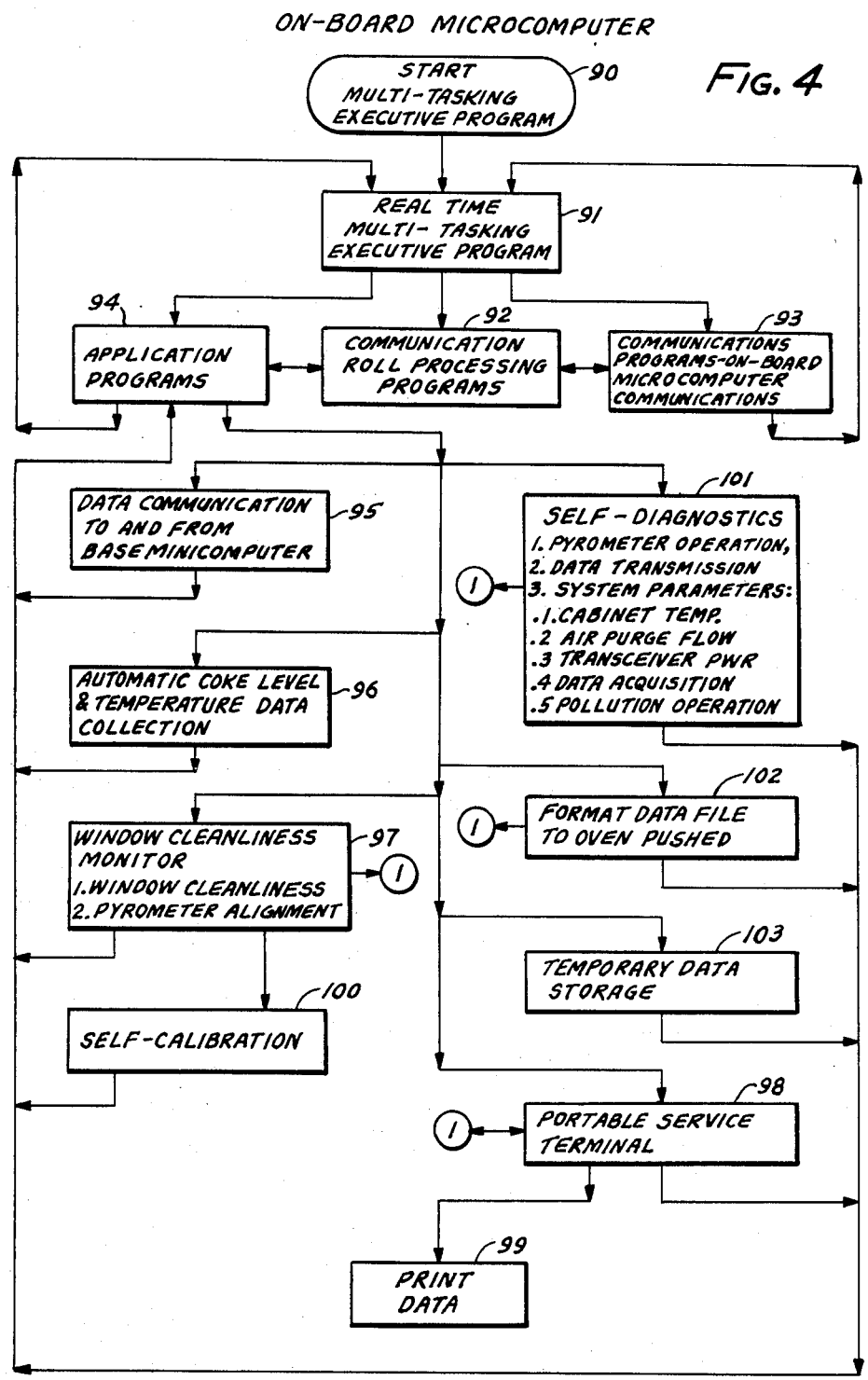

10:08:22 BEGIN NEW CYCLE             *Fig. 5*

10:14:46 GUIDE IN PLACE

10:14:51 OVEN NUMBER ENTERED

10:14:51 COLLECTION CYCLE START

10:17:39 STORE CYCLE START

10:18:14 COLLECTION CYCLE OVER
          OVEN NUMBER 09

10:18:30 GUIDE OUT
          DIAGNOSTICS = 00 00 00 00 00 00 00 08 00 00

TASK - R6

ENTER OVEN NUM-
09

*Fig. 6*

OVEN NUMBER 09
START OF PUSH 10:27
TIME OF PUSH 36

|  | WINDOW | CLEANLINESS | TEMPS |  |  |
|---|---|---|---|---|---|
|  | 1791 | 1791 | 1791 | 1752 | 1789 |
| INTVL | PYRO 1 | PYRO 2 | PYRO 3 | PYRO 4 | PYRO 5 |
| 1 | 1773 | 1787 | 1819 | 1202 | 1202 |
| 2 | 1858 | 2018 | 1926 | 1206 | 1200 |
| 3 | 1789 | 2018 | 1960 | 1226 | 1199 |
| 4 | 1761 | 1988 | 2048 | 1675 | 1203 |
| 5 | 2014 | 2112 | 2187 | 2064 | 1615 |
| 6 | 2051 | 2135 | 2197 | 2022 | 1632 |
| 7 | 2186 | 2219 | 2222 | 2035 | 1517 |
| 8 | 2136 | 2167 | 2191 | 2072 | 1603 |
| 9 | 2086 | 2105 | 2186 | 2047 | 1536 |
| 10 | 2139 | 2175 | 2164 | 2057 | 1551 |
| . | . | . | . | . | . |
| 37 | 2121 | 2081 | 2086 | 2049 | 1468 |
| 38 | 2103 | 2117 | 2087 | 2087 | 1204 |
| 39 | 2121 | 2086 | 2124 | 2114 | 1207 |
| 40 | 2044 | 2048 | 2039 | 1979 | 1213 |
| 41 | 1978 | 1992 | 1965 | 1753 | 1215 |
| 42 | 1259 | 1206 | 1200 | 1202 | 1219 |
| 43 | 1210 | 1206 | 1200 | 1202 | 1221 |
| 44 | 1696 | 1205 | 1200 | 1202 | 1216 |
| 45 | 1679 | 1205 | 1493 | 1202 | 1216 |
| 46 | 1661 | 1205 | 1200 | 1202 | 1200 |
| 47 | 1663 | 1205 | 1200 | 1201 | 1200 |

R1    HELP TASK    *FIG. 7*

TASKS AVAILABLE FOR OPERATOR

R8   WRITE MSG TASK - END MSG WITH CR., END TASK WITH ESC.
R7   CALIBRATE TASK - SELECT PYRO * , WCM ON/OFF , END TASK WITH SP.
R6   DATA DUMP TASK - ENTER OVEN * , END TASK WITH SP.
R5   ANALOG CHECK TASK - ENTER TEMP(1500-2500)
R4   DATA TRANSMISSION CHECK - NEEDS TI TERM. AT BOTH MODEM, END TASK WITH SP.

DIAGNOSTICS

1 - PYRO NOT WORKING DURING WCM
2 - DATA ACQUISITION FAILURE
3 - HEAD OUT OF ALIGNMENT
4 - HEAD OVERTEMP.
5 - CABINET OUT OF TEMP. RANGE
6 - AIR PURGE FAILURE
7 - RF CARRIER FAILURE
8 - DIRTY WINDOW
9 - COMMUNICATION TIME OUT
10 - POLLUTION CONTROL OFF

*FIG. 12*

BASE COMPUTER PUSH SCHEDULE OUTPUT

| DAY | OVEN # | BEGIN TIME | DIAGNOSTIC | # READINGS |
|---|---|---|---|---|
| 290 | 67 | 1506 | 8 | 235 |
| 290 | 77 | 1517 | 4 | 235 |
| 290 | 87 | 1529 | 0 | 235 |
| 290 | 9 | 1542 | 0 | 235 |
| 290 | 19 | 1552 | 0 | 235 |

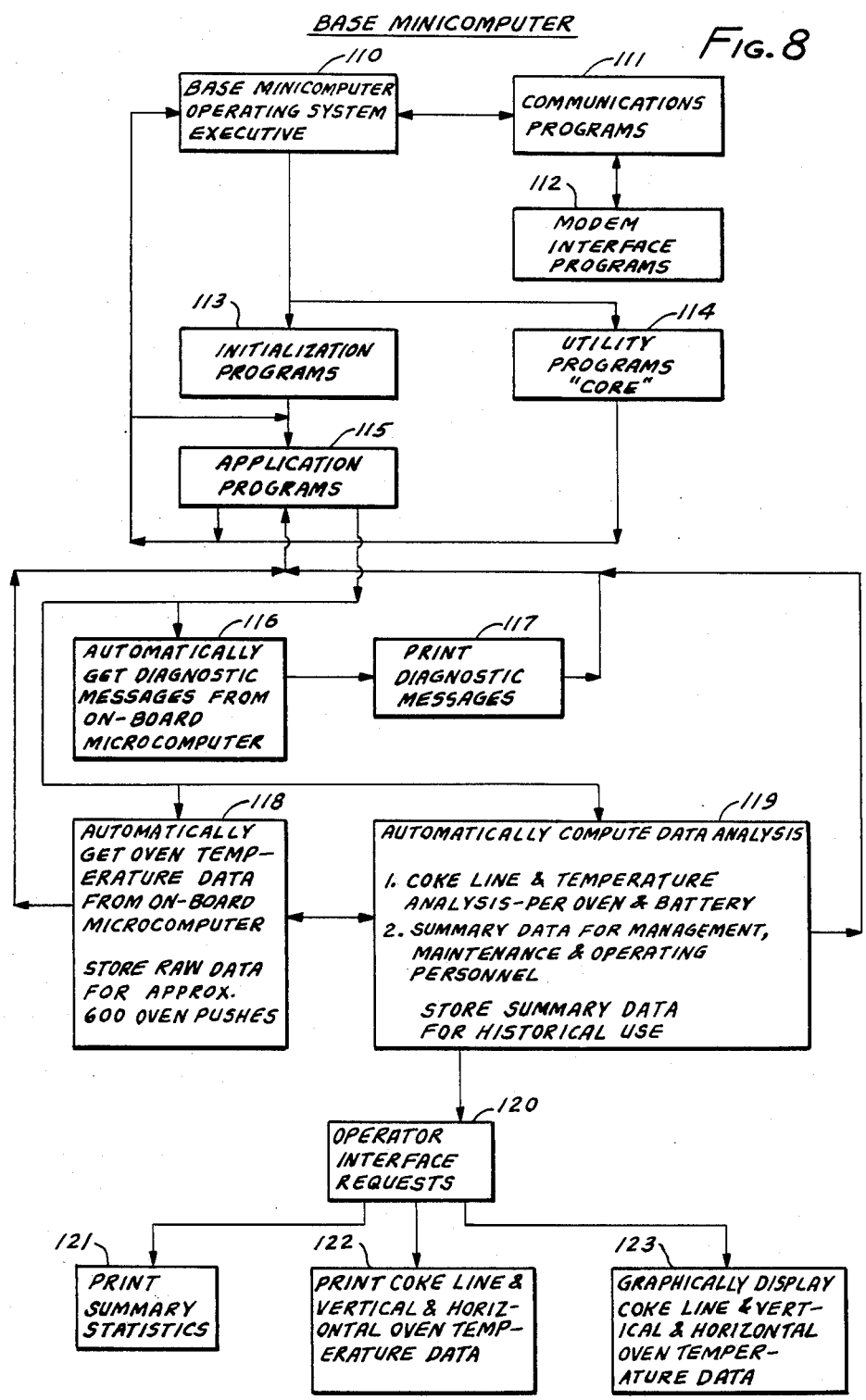

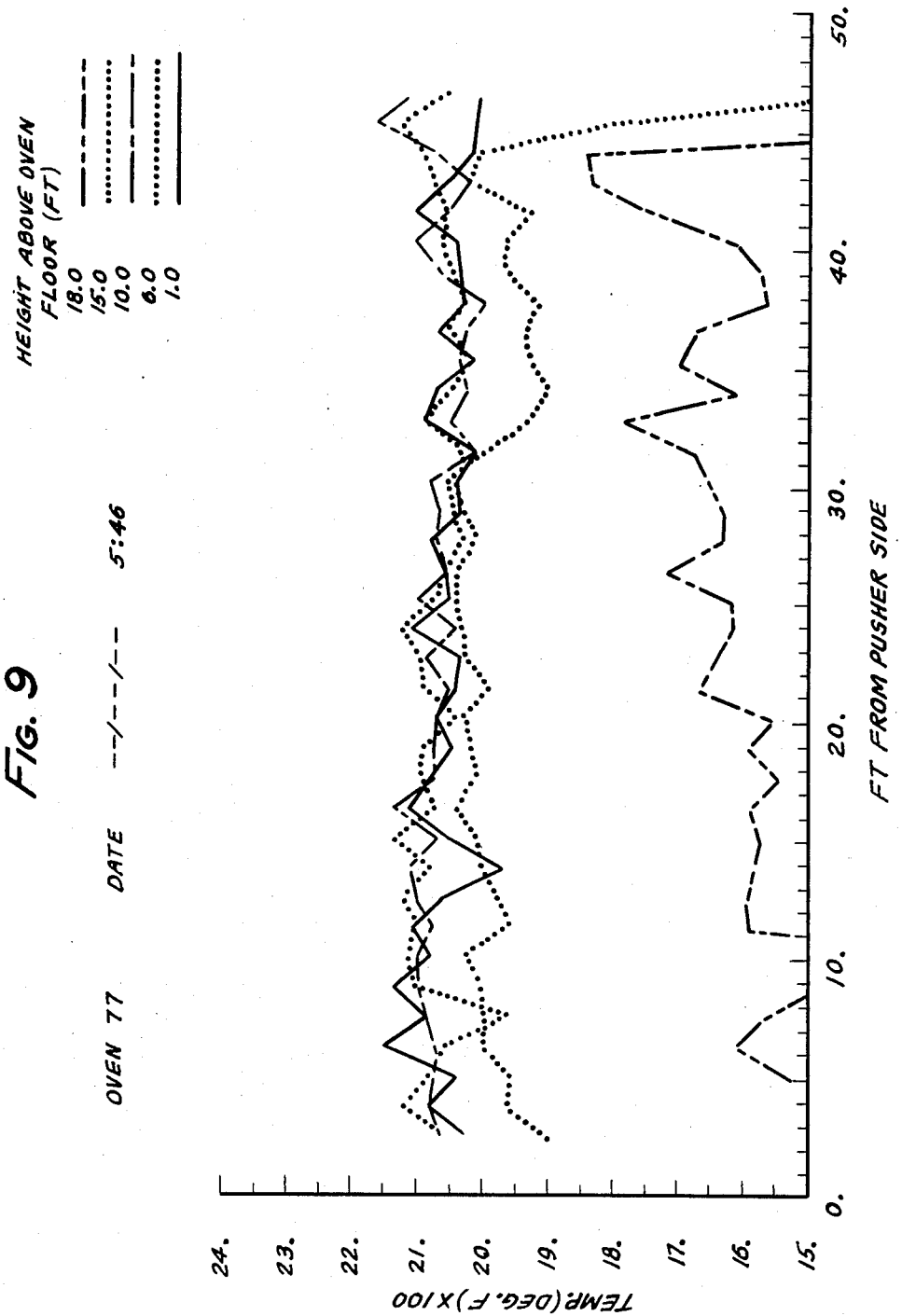

Fig.11

```
OVEN= 88  DAY= 179  TIME= 2315  DIAGNOSTIC= 2  SETS GOOD READINGS= 38

AVE. HORZ. TEMP. LEVEL1= 1982  LEVEL2= 2002  LEVEL3= 1931  LEVEL4= 1711
VAR. HORZ. TEMP. LEVEL1=  117  LEVEL2=  115  LEVEL3=   88  LEVEL4=   91

AVE. OVEN TEMP.= 1909     COKE LINE BELOW LEVEL4= 16%  LEVEL5= 100%

AVE. VERT. TEMP. DIFF.  SEGMENT 1 =  68
                        SEGMENT 2 = 264
                        SEGMENT 3 = 274
                        SEGMENT 4 = 316
                        SEGMENT 5 = 322
                        SEGMENT 6 =  88

SEGMENTS 2 TO 5 MAX. TEMP. = 2139  SEGMENT= 5
SEGMENTS 2 TO 5 MIN. TEMP. = 1587  SEGMENT= 2
```

Fig.13

```
        DATE      TIME                          DATE      TIME
A    --/--/--  12: 30: 40             F     --/--/--  12: 58: 40
       WCM ALARM    PYRO #                   DATA ACQUISITION NOT WORKING
       #            4

B    --/--/--  12: 46: 40              G    --/--/--  13:  0: 41
       PYRO NOT WORKING DURING WCM           SIGHT PATH OBSTRUCTED
       #                                     #  1

C    --/--/--  12: 48: 40              H    --/--/--  13:  4: 40
       MAIN PKG OVER TEMPERATURE             HEAD OVER TEMPERATURE
                                             #  2

D    --/--/--  12: 52: 40              I    --/--/--  13:  6: 40
       SIGHT PATH OBSTRUCTED                 AIR PURGE FAILURE
       #

E    --/--/--  12: 52: 40              J    --/--/--  13: 10: 40
       PYRO NOT WORKING DURING WCM           MICRO POWER UP RESTART
       #
```

METHOD AND SYSTEM FOR DETERMINING MASS TEMPERATURE IN A HOSTILE ENVIRONMENT

CROSS-REFERENCE TO RELATED APPLICATION

This is a continuation-in-part application of application Ser. No. 328,775, filed Dec. 8, 1981 now abandoned.

BACKGROUND OF THE INVENTION

This invention relates to temperature measurements. More particularly, this invention relates to a computer-based method and system for determining temperature of an irradiant mass movable through process means in a hostile environment. The invention is exemplified hereinafter which will automatically determine temperature of coke in the environment of a coke guide or coke oven. The invention may also be used in other industries having process means in a hostile environment such as at cement kilns and the like.

DESCRIPTION OF THE PRIOR ART

In batch type coke production, a door machine positions a coke guide at a selected oven, removes a coke side oven door. Then an irradiant coke mass is pushed through the coke guide into a quench car. It is important in coke production to obtain accurate and reliable temperature measurements of the coke oven and/or the coke mass continuously during coking and/or pushing. Accurate temperature measurements allow the operator to identify problems, maximize production, minimize pollution problems and prioritize maintenance scheduling. In-furnace thermocouples are not practical for continuously monitoring coke oven temperatures because of the large physical size of the ovens and the fact that a hundred or more coke ovens may constitute a normal size battery. An alternative is to use a pyrometer to measure the temperature of coke as it is pushed from the coke oven and relate it to coke oven wall temperature. However, in view of the hostile environment of hot, dusty and dirty coke mass, particularly at the coke guide, the accuracy and reliability of electro-optical components, such as infrared pyrometers, become degraded. Errors can occur in the pyrometer measurements from dust and dirt buildup on the pyrometer window. Additional errors can be attributed to electronic drift resulting from high ambient temperatures.

In hostile environments where optical temperature measurements are made, many operators follow a practice of only occasionally cleaning pyrometer windows, either manually off-line or using an air purge, and manually recalibrating the measuring instrument in an attempt to minimize errors caused by dirt building up on the window. Air purge failures have gone unnoticed and caused measurement errors as well as serious damage to expensive instruments. In others, such as in Assignee's copending application titled "Method of Determining Coke Level," Ser. No. 161,845, filed on June 23, 1980, a lens-tipped optical fibre bundle senses the coke temperature and conducts infrared energy therethrough to a distant pyrometer in an electronic equipment enclosure. Errors arise, sometimes after only short-term operation, from heat damage, dirty sight windows and broken optical fibres suffered in the coke guide and coke oven hostile environment.

Another prior art arrangement for detecting optical instrument window cleanliness is Assignee's copending application titled "Optical Attenuation Monitor System and Method," Ser. No. 136,847, filed on Apr. 3, 1980. This arrangement uses an internal reference light source projected through an optical window, and any dirt on the outer surface causes reference light to be reflected inwardly as backscatter radiation. Backscatter radiation is detected as a function of dirt, and used as an error correction source. While this arrangement has many advantageous uses, it has not proved entirely satisfactory for use in the hostile environment of a coke guide because of high heat and other factors.

In some installations, electronic equipment is cooled to some extent by air purging in an endeavor to minimize drift. These, and the foregoing, prior art practices do not provide a commercially available method or system with either short- or long-term solution to accurate and reliable coke guide and coke oven temperature measurements, capable of automatically processing the measurements under continuous production operating conditions while providing a coke oven operator with improved benefits.

SUMMARY OF THE INVENTION

It is an object of this invention to provide a production-worthy method and system for automatically and continuously determining the temperature of an irradiant mass movable through process means in hostile environment which can minimize rate of degrading and overcome the foregoing difficulties.

Another object of this invention is to provide a method and system for automatically determining the temperature of an irradiant mass movable through process means in a hostile environment which will have improved long-term accuracy and reliability.

Yet another objective of this invention is to provide a method and system of determining the temperature of an irradiant mass movable through process means in a hostile environment which will require substantially less maintenance than heretofore.

Still another object of this invention is to provide a method and system for automatically determining the temperature of an irradiant mass movable through process means which will enable an operator to improve coke quality, increase coke battery life, reduce fuel consumption, reduce emissions and prioritize maintenance.

The foregoing method and system objects may be attained by providing a production-worthy system comprising two computer-based subsystems for determining temperature of an irradiant mass movable through process means in a hostile environment, such as temperature of coke in the environment of a coke guide and coke oven in a battery of ovens. First subsystem which is carried on a movable coke guide/door machine combination, includes one or more coke guide pyrometers arranged vertically, each with a sighting window monitor to detect optical errors, an onboard computerized and cooled electronics package for acquiring and processing coke temperature coke data, during, for example, a coke pushing cycle, and automatically detecting same for pyrometer drift and optical errors caused by the hostile environment, and automatically correcting for these errors, and further including a plug-in portable terminal with printer.

The second computer-based subsystem is stationed in a central office, or elsewhere having a base computer package with various computation and storage capabilities and includes a CRT control terminal for operator interaction with the entire system, a line printer and a printer/plotter. Two-way data communication between the two subsystems is exemplified as a two-way radio link. Each subsystem logs both coke level data and coke vertical and horizontal temperature profile data and alarm messages. Tabular printouts of coke mass temperature, coke level and diagnostic data are provided by both the portable terminal printer in the onboard subsystem and the base computer printers. Graphical displays are also provided by the base computer subsystem of coke level, temperature and summary data, oven push schedules and/or self-diagnostic message of various process and measurement operations.

BRIEF DESCRIPTION OF THE DRAWINGS

FIG. 4 is a functional flow chart of the microcomputer used in the onboard subsystem of this invention.

FIG. 5 is a typical system status sheet printed by a printer in the portable service module in the onboard electronics subsystem shown in FIG. 1.

FIG. 6 is typical corrected temperature data, tabularized under the FIG. 5 heading which is acquired by the computerized onboard electronics subsystem.

FIG. 7 is a typical help task, including tasks available for an operator and diagnostics, printed by the portable service module. Similar diagnostic data is available on the line printer in the base computer subsystem.

FIG. 8 is a functional flow chart of the mini-computer used in the base subsystem of this invention.

FIG. 9 is a typical graph of acquired coke temperature and coke level data for a given coke oven printed by the printer/plotter in the base subsystem.

FIG. 11 is a typical summarized printout of a given coke oven horizontal and vertical temperature profile data, including average temperature and coke levels, as determined by the minicomputer and printed by the line printer at the base station.

FIG. 12 is a typical line printer printout of the base minicomputer push schedule output for a partial day in given coke oven battery.

FIG. 13 is a typical line printer printout of the base minicomputer diagnostic output for a given oven push in the push schedule.

DESCRIPTION OF THE PREFERRED EMBODIMENTS

Figure 1:
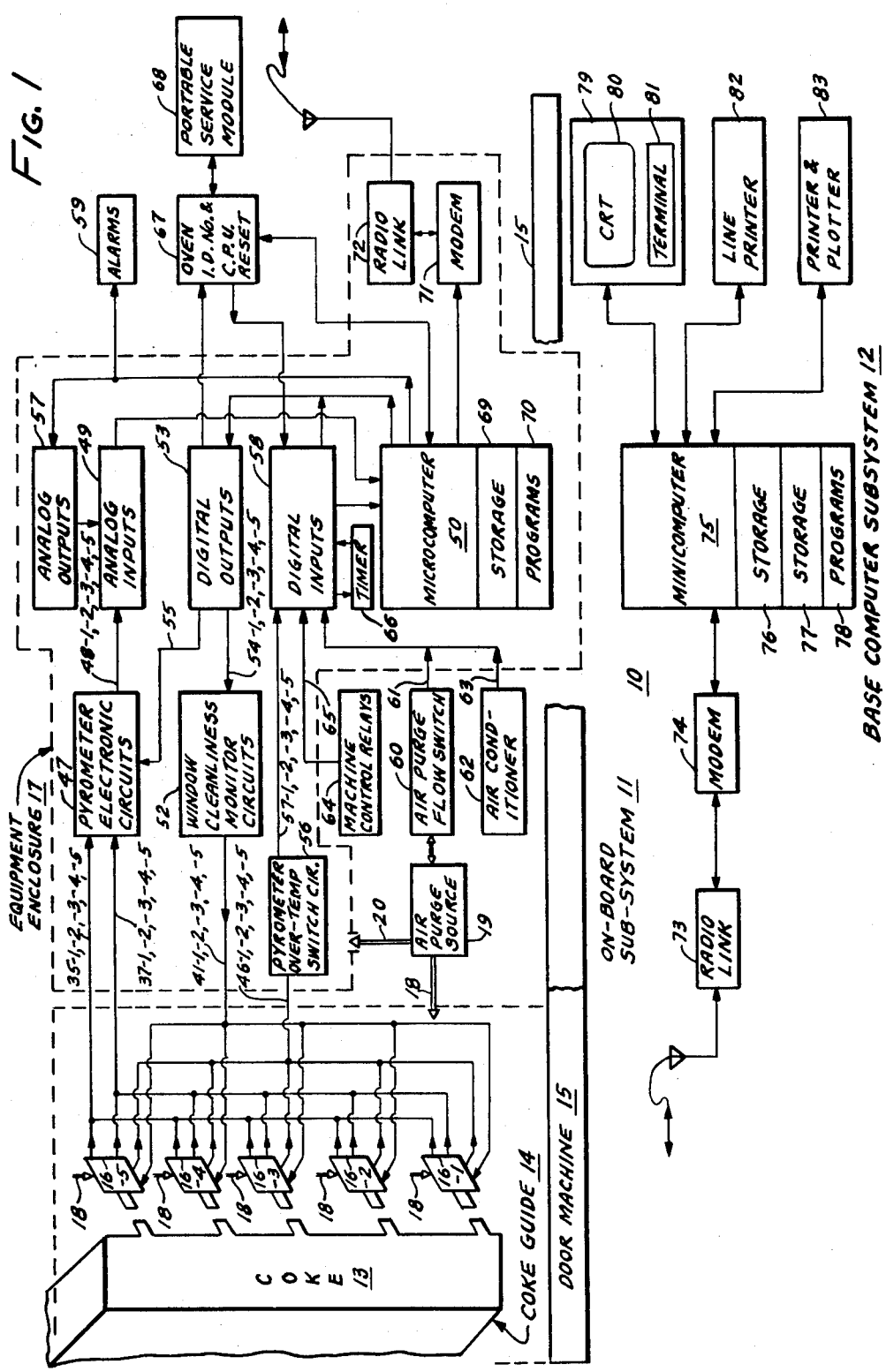
FIG. 1 is a block diagram of the computerized temperature measuring system of this invention having an onboard electronics subsystem on the coke guide/door machine and a base computer subsystem in a central office.

Referring now to the drawings, FIGS. 1 to 13 and particularly to FIG. 1 the production-worthy computer-based system for determining mass temperature in a hostile environment, or simply overall system 10 of this invention, is shown, for example, installed on the coke side of one of numerous coke ovens in a coke oven battery (not shown). Overall system 10 is made up of two subsystems, namely, onboard subsystem 11 carried by a movable coke guide/door machine combination from oven-to-oven, and base computer subsystem 12 stationed in a central office (not shown) having a base computerized subsystem 11,12 may be apportioned differently than described below depending on user preference.

Reference will be made to computer-based subsystem 11 at first. When ready, irradiant coke 13, at approx. 1093° C. (2000° F.) is pushed by pusher means (not shown) through coke guide 14 and into a quench car (not shown). Coke guide 14 is positioned at the coke side of the selected oven site by door machine 15 after first removing the coke side oven door. Because uniform vertical and horizontal coke temperature along the length of the individual ovens is an important coke making parameter, it is of great importance that coke temperature at coke guide 14, or elsewhere, be continuously obtained on an accurate and reliable basis. Otherwise the entire cokemaking process control will suffer, along with coke quality operating and maintenance cost, and ultimate profitability.

Accordingly, production-worthy computer-based subsystem 11 is provided with a group of five pyrometer heads 16-1,-2,-3,-4,-5 mounted vertically on coke guide 14, each at a different level, and associated electronic circuit means, including means for self-calibrating the coke temperature signal, all contained in equipment enclosure 17 mounted on door machine 15 with interconnecting electronic and pneumatic services described below. Each device 16-1,-2,-3,-4,-5, and 17 is constructed of materials suitable to resist their respective hostile environments. Pyrometer heads 16-1,-2,-3,-4,-5, each have a housing purged of dust and dirt and is cooled to some extent by air on line 18 from air purge source 19 carried on door machine 15. Similarly, equipment enclosure 17 has a housing also purged of dust and dirt and cooled to a limited extent by air on line 20 from source 19. When the electronic circuits inside equipment enclosure 17 are heat sensitive and/or tend to drift beyond the cooling capabilities supplied from air line 20, then air conditioner 21 of sufficient capacity may, if desired, be substituted for the cooling source from air line 20.

Figure 2:
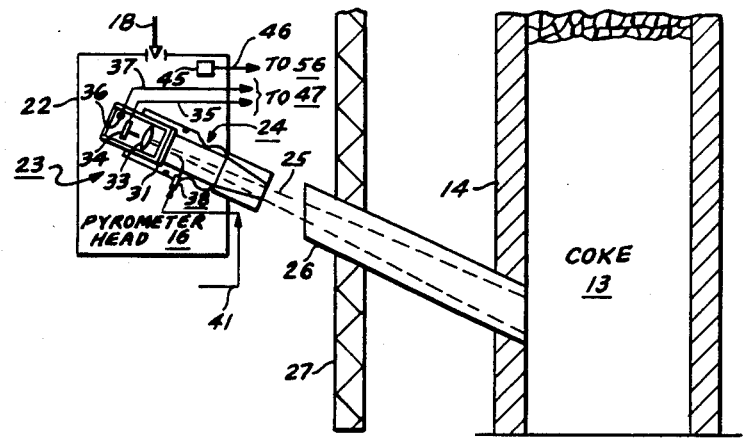
FIG. 2 is a schematic cross section of a coke guide showing a typical pyrometer head positioned at a sight tube.
Figure 3:
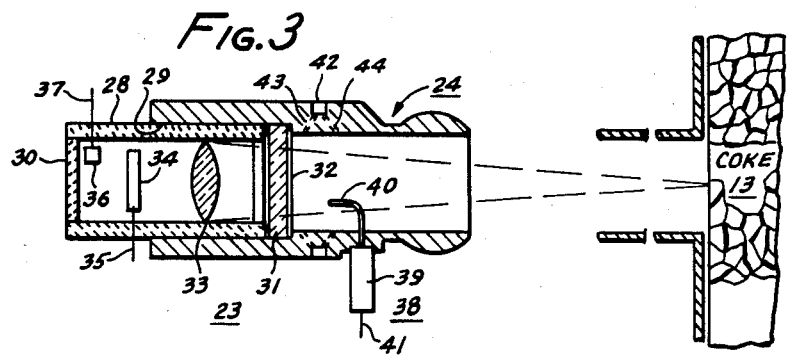
FIG. 3 is a schematic cross section of a typical pyrometer head with a window cleanliness monitor assembly of this invention.
Figure 10A:
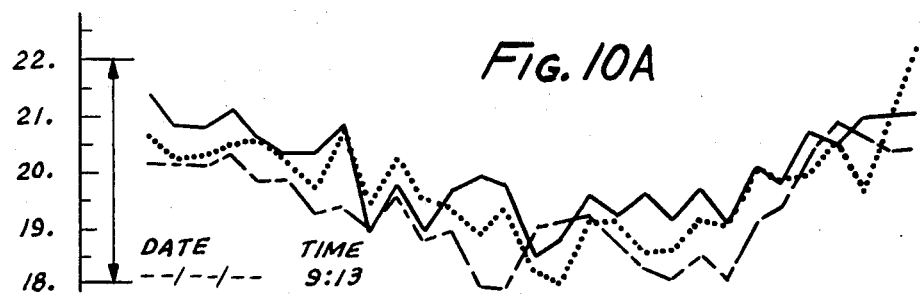
FIGS. 10A to D are typical graphs of acquired temperature data for the same coke oven on four separate pushes and printed by the printer/plotter in the base subsystem.
Figure 10B:
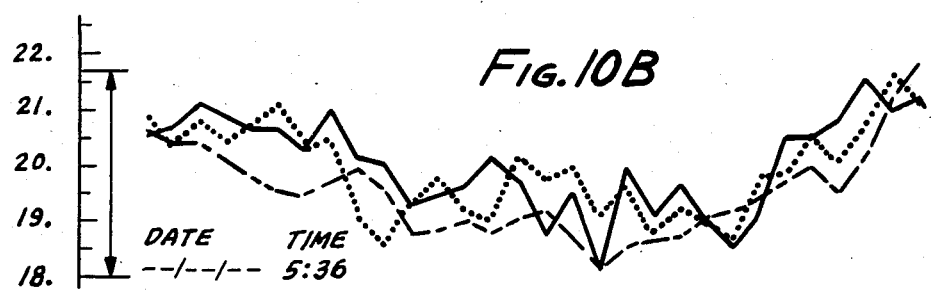
Figure 10C:
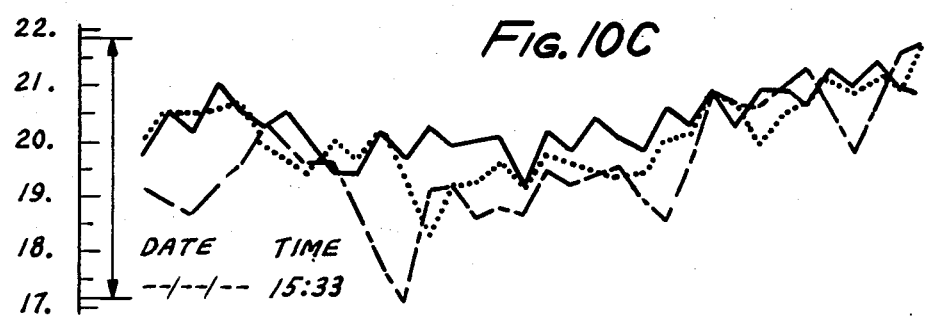
Figure 10D:
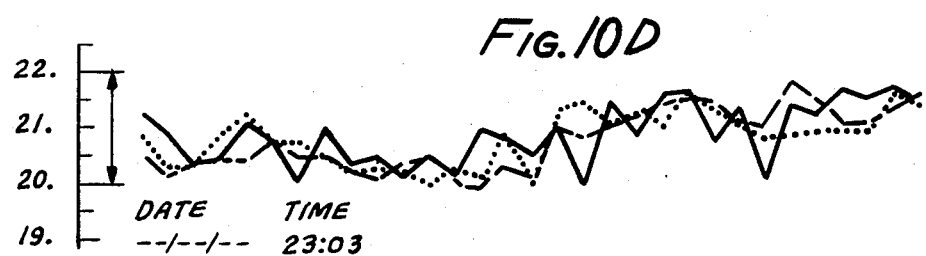

As shown in FIGS. 2,3, a typical pyrometer head 16 located at each vertical level includes a pyrometer housing 22, which is resistant to hostile environmental elements and purged by air line 18 from source 19, an optical pyrometer assembly 23 in housing 22, tubular adjustable mount 24 for aiming pyrometer assembly 23 to pick up irradiant coke image 25 through a separate sight tube 26 at each vertical level. Sight tube 26 is located between pollution barrier 25 and an outer wall of coke guide 14 which form part of the entire structure of coke guide 14/door machine 15 combination. Included in pyrometer assembly 23 is a tubular housing 28 adapted to be slip-fitted into tubular opening 29 of adjustable mount 24. Tubular housing 28 closed at end 30 includes coke sighting window 31 made of quartz glass at the opposite end which is subject to optical error by hostile environmental matter 32, such as a dirt film buildup on window 3. Also included in pyrometer assembly 23, within tubular housing 28, are lenses 33 for focusing irradiant coke image on an infrared pyrometer detector 34 which generates a mass or coke temperature signal on line 35, and pyrometer 28 ambient temperature sensor 36, such as a positor device, which generates a pyrometer ambient temperature signal on line 37.

Pyrometer assembly 23, in addition, is provided with window cleanliness monitor (WCM) means 38 having a preferred embodiment showing FIG. 3. WCM means 38 has a WCM light assembly 39 with a stable source of light which is transmitted through light conducting fibre optic 40. Light conducting fibre optical 40 has an end outside coke sighting window 31 aimed toward pyrometer detector 34 inside housing 28. The stable light source inside monitor light assembly 39 is turned on by a WCM control signal on line 41 to determine the amount of window optical error introduced in the coke temperature signal on line 35 caused by the buildup of dirt film 32 on coke sighting window 31 and similar matter on the end of fibre optic 40. When the WCM control signal is turned off, such as during normal pyrometer operation, the WCM ceases to function.

Also included in adjustable mount 24 is an air purge manifold 42 encircling the tubular portion of mount 24 with a first plurality of air purge jets 43 directed toward dirt film 32 on window 31. A second set of air purge jets 44 is aimed in the end direction of WCM light conducting fibre optic 40. The combined effect of air purge jets 43, 44 tends to minimize dirt form entering pyrometer mount 24. In addition, an air wiping effect tends to clean equally the dirt film 32 from coke sighting window 31 an from the end of fibre optic 40.

Inside pyrometer housing 22 is over-temperature switch 45 which generates an over-temperature signal on line 46 whenever the ambient temperature inside housing 22 approaches a temperature which will cause permanent damage to electronics components therein, such as damage to detector 34 and sensor 36.

Referring back to FIG. 1, the circuit means shown in equipment enclosure 17, may be individual hardwired circuits, or one or more may be incorporated in the microcomputer shown in subsystem 11 and programmed to perform the same processing, correction and self-diagnostic functions as shown and described herein.

The five pyrometer heads 16-1,-2,-3,-4,-5, each output a separate coke temperature signal on lines 35-1,-2,-3,-4,-5, representing coke temperature at its respective vertical level in coke guide 14. Each coke temperature signal is susceptible to two forms of errors, namely, pyrometer ambient temperature drift error at its particular level and window optical error. The coke temperature signals on lines 35-1,-2,-3,-4 -5 are fed to pyrometer electronic circuits 47 which include conventional linearizing and scaling circuits for accommodating the characteristics of each coke temperature sensing infrared optical pyrometer detector 34-1,-2,-3,-4,-5 (shown as 34 in FIGS. 2,3). Pyrometer electronic circuits 47 are modified to correct each of the five pyrometer signals for pyrometer ambient temperature drift as a function of respective pyrometer ambient temperature signals received on lines 37-1,-2,-3,-4,-5, thereby outputting a corresponding drift corrected coke temperature signal on each line 48-1,-2,-3,-4 -5. These signals are fed to computer analog input device 49 and then to microcomputer 50 for processing as described below. Computer analog outputs 57 are switched under control of microcomputer 50 to act as a source of a calibration reference in place of the coke temperature signals for determining the stability of microcomputer 50 data acquisition system.

Equipment enclosure 17 includes a five-channel window cleanliness monitor (WCM) circuits 52, which output five corresponding WCM control signals on lines 41-1,-2,3, -4,-5, respectively, to one of the five window cleanliness monitor light assembly 39, described above in connection with pyrometer head 16 shown in FIGS. 2 and 3. Before making the five coke mass temperature measurements, the WCM control signals 41-1,-2,-3,-4,-5 are generated by computer digital outputs 53 which, under control of microcomputer 50, generate five corresponding WCM on-off control signals fed on line 54-1,-2,-3,-4,-5, to WCM circuits 52. Thus, each WCM light source 39 in each pyrometer assembly is turned on and off, respectively, before and after coke mass 13 movement starts through coke guide 14 as determined by coke guide 14 movement. This establishes a basis for detecting the amount of optical error in each of the five drift-corrected coke temperature signals on lines 48-1,-2,-3,-4,-5, caused by dirt film 32 on coke mass sighting window 31 as will be explained below.

Computer digital outputs 53 also under control of microcomputer 50 generate a pyrometer reset control signal 55 to the five pyrometer electronic circuits 47 to reset the temperature reading at the end of a predetermined time period.

Still referring to FIG. 1, on-board subsystem 1 makes certain self-diagnostic checks. For example, the five pyrometer over-temperature signals on lines 46-1-2,-3,-4,-5, which originate from one each of the five over-temperature switches (shown as 45 in FIG. 2), are fed to pyrometer over-temperature switch circuits 56. Circuits 56 inturn fed five diagnostic over-temperature signals on lines 57-1,-2, -3,- 4,-5, to an input of computer digital inputs 58, through microcomputer 50 and display diagnostic messages on, for example alarm device 59 or other computer peripherals, signifying a condition that its respective pyrometer head housing 22 has reached its safe limit before damaging the content of housing 22.

An additional self-diagnostic feature is generated by air purge flow switch 60 which senses and signals an alarm message on line 61 concerning the failure of air purge source 19. Such failure ceases to supply purge air to jet wipes and cooling air to each pyrometer head 16-1,-2,-3,-4, -5, and purge air on line 20 to equipment enclosure 17 when used. The air flow loss alarm message is also fed through digital inputs 58, microcomputer 50, and alarm device 59 and other peripherals.

Still another self-diagnostic feature is generated by air conditioner 62 whenever cooling air supply is lost to equipment enclosure 17. A contact closure in air conditioner 62 sends an air conditioning failure alarm signal over line 63 to digital inputs 58, microcomputer 50 and alarm device 59 and other peripherals. This alarm signal also alerts the user that uncorrectable errors are present and failure of electronic circuits in equipment enclosure 17 is imminent.

Still other digital inputs to input device 58, and to microcomputer 50, are by way of machine control relays 64 through line 65 to device 58. Machine control relays 64 rovide interlock control signals for microcomputer 50 to use signifying that a sliding frame 16-1,-2,-3,-4,-5 has been in place and that coke guide 14 is in place ready to receive the coke mass 13 to be pushed by the pusher machine. If any of the foregoing conditions are not met, then data is not collected for that oven.

A digital timer 66 is provided for generating digital timing signals at predetermine intervals corresponding to coke mass movement distance covered by the pusher machine ram and the total travel time by the pusher. Timer 66 is started and stopped when the coke pushing cycle is started and stopped. Digital timer 66 signals are also used by microcomputer 50 to control the data acquisition rate of the five coke mass temperature signals according to computer programs described below.

Computer-based onboard subsystem 11 also includes within the door machine 15 operator's control device 67 for generating a coke oven identification number, used by base computer subsystem 12 described below Device 67 also includes a reset function for microcomputer 50 which can be activated in response to an error diagnostic message. In addition there is included a printer type portable service terminal 68 which is plugged in the onboard subsystem 11 for data logging, servicing, diagnostic and maintenance purposes. Use of portable service terminal 68 will be described below in connection with FIGS. 5,6,7 illustrations of terminal 68 printouts.

Microcomputer 50 in on-board subsystem 11 is provided with storage means 69 of adequate capacity to perform the variety of functions described below. Microcomputer 50 is operated under control of computer programs 70 with a functional flow chart thereof shown in FIG. 4. Bidirectional data communications are handled through model 71 and two-way radio link 72 to and from the base computer subsystem 12.

Reference will now be made to the base computer subsystem 12 portion of the overall computer-based system 10 for determining coke mass temperature shown in FIG. 1 and located in central station. Subsystem 12 comprises two-way radio link 73, for bidirectional communication to and from onboard subsystem 11, two-way model 74, minicomputer 75, short-term storage device 76, long-term storage device 77, and computer programs 78. Programs 78 are illustrated in FIG. 8 which is a functional flow charge for all operating control communications. These are used to acquire coke mass temperature data, machine functions, to perform data calculations, document the generated oven pushing schedules, summarize data, diagnostics, and prioritize maintenance requirements.

Also included in base computer subsystem 12 and connected to the output of minicomputer 75 are minicomputer peripheral 79 having a CRT display 80 and terminal 81 for providing operator interaction and requests. In addition, there is provided a line printer 81 for displaying FIGS. 11,12,13 tabular data printouts, and a printer plotter 83 for producing graphical printouts shown in FIGS. 9 and 10A–D.

Returning now to onboard subsystem 11, a summary of operations follows relative to FIG. 4 steps 90 to 103 covering multitasking executive program of at least four major tasks.

When coke 13 is ready to be pushed from an oven, door machine 15 is aligned with the oven to be pushed and coke guide 14 is inserted into the door opening. The pusher car ram pushes the coke 13 from the oven, through coke guide 14, and into the quench car. As coke 13 passes through coke guide 14, five pyrometer heads 16-1,-2,-3,-4,-5 mounted at different levels above the sole of the oven, measure the coke temperature at their respective levels. Mirocomputer 50 sequentially monitors the peak pyrometer readings on ¾ second intervals and stores these coke temperature data. During a push, a total of approximately 40 temperature readings are obtained per pyrometer. These data are temporarily stored in microcomputer 50 storage 69 along with data from the previous four pushes.

In addition to controlling coke temperature data collection, microcomputer 50 also monitors the cleanliness of pyrometer windows 31 (window cleanliness monitor), provides self-diagnostic checks, and if desired, performs a self-calibration of overall system 10. Self-calibration is an important function on some installations. These features of subsystem 11 allow the equipment to operate reliably and with mlnimum maintenance. Details of each of these unique features follows:

In FIG. 4 functional flow chart of steps 90 to 103, the onboard microcomputer 50 is programmed in step 90 to start a multi-tasking executive program. Step 90 proceeds to step 91 real time executive program, then to internal communications poll processing programs and step 93 communications for onboard microcomputer 50 communications. When completed, step 93 loops back to step 91. Step 91 also proceeds to step 94 covering several applications programs and also loops back to step 91.

Figure 14:
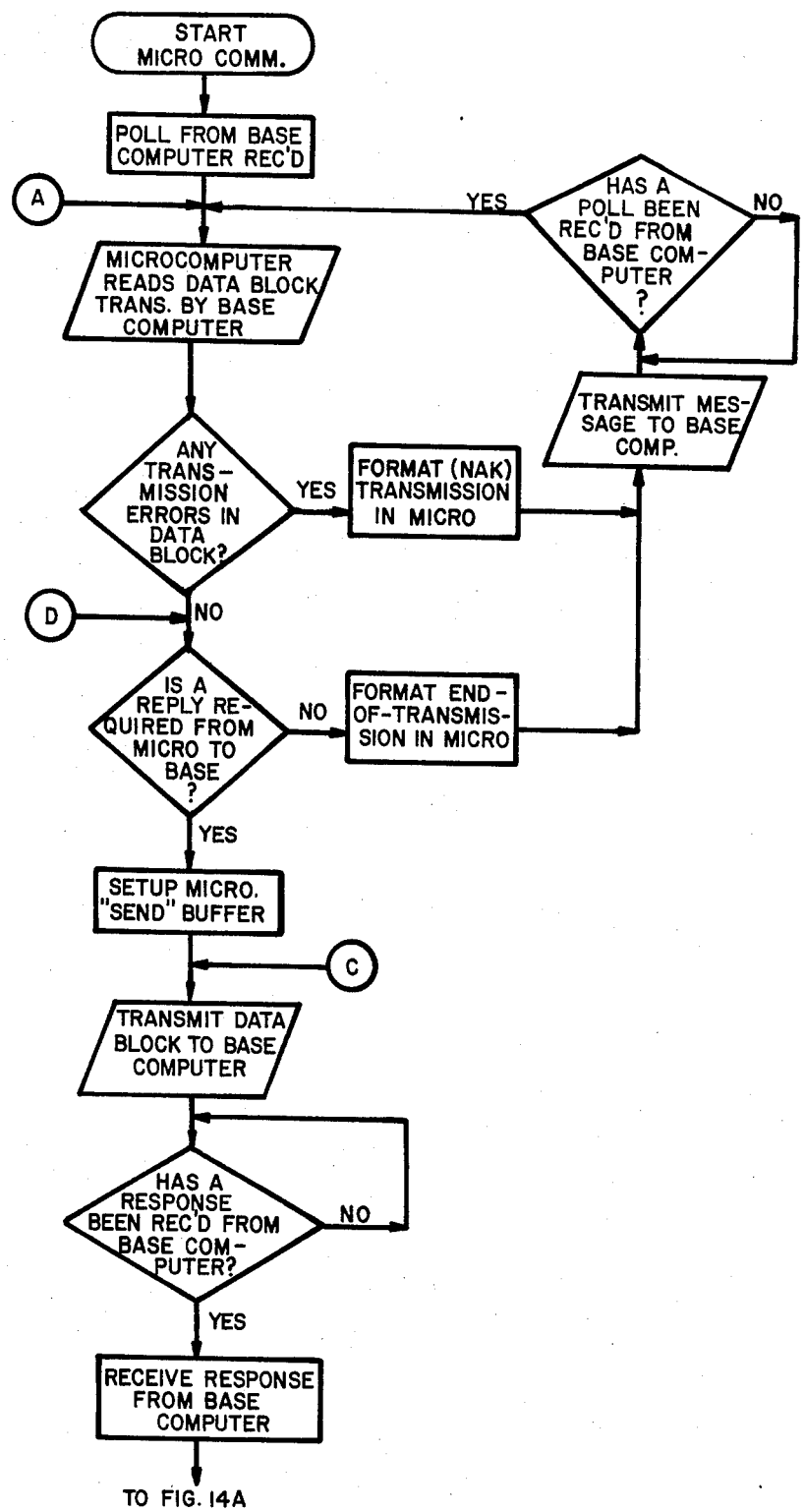
FIG. 14 and 14A are functional flow charts of data communications to and from base minicomputer.
Figure 14A:
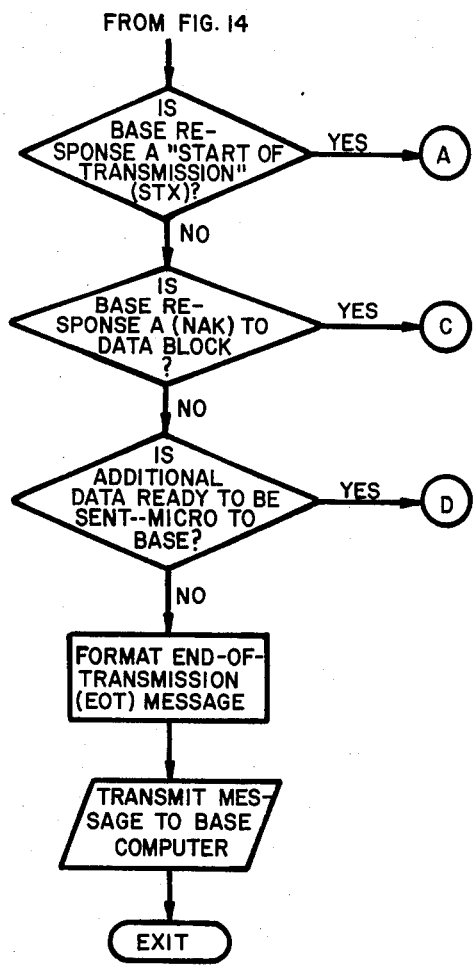
Figure 15:
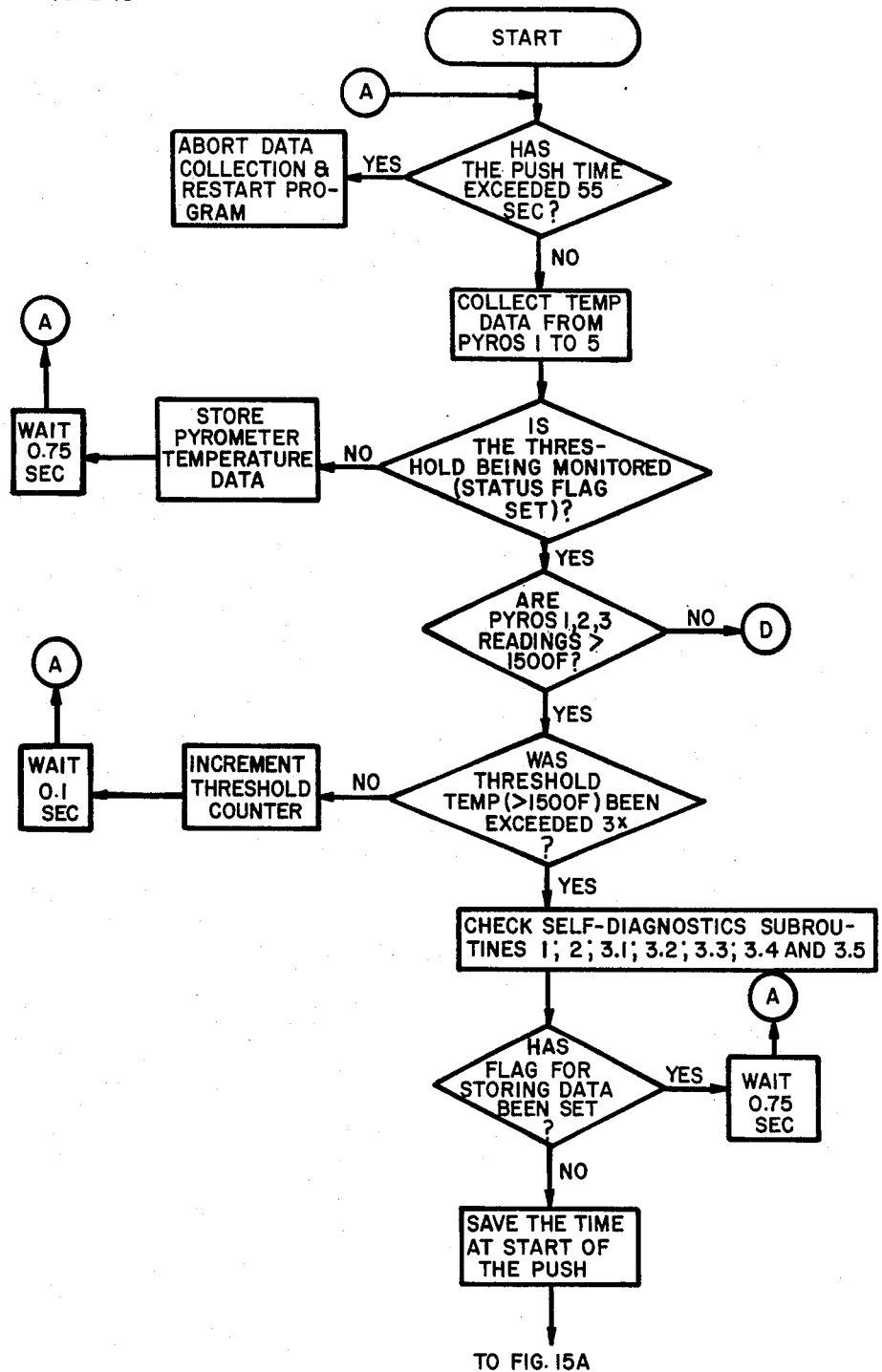
FIGS. 15 to 15C are functional flow charts of automatic coke level and temperature data collection.
Figure 15A:
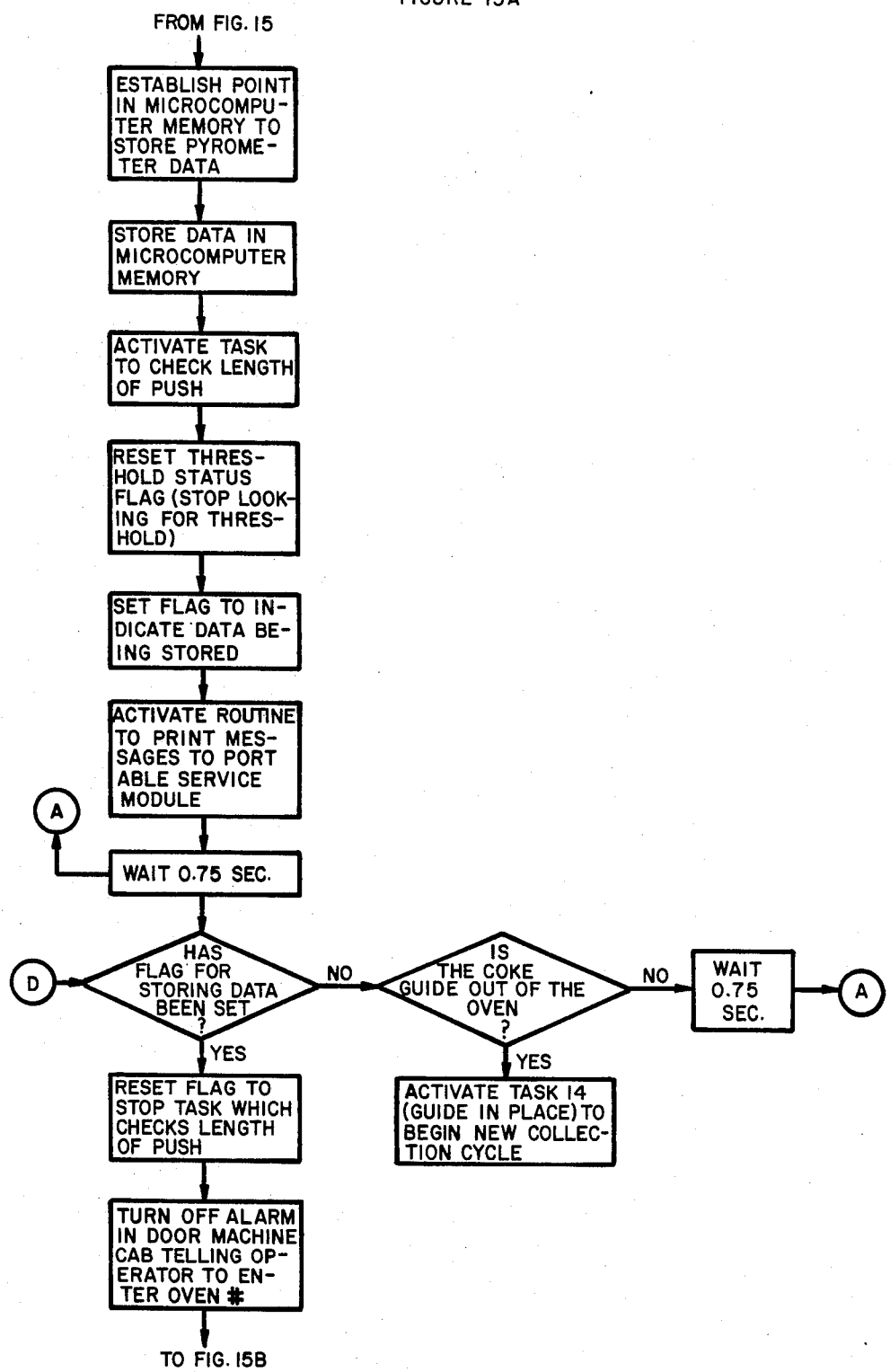
Figure 15B:
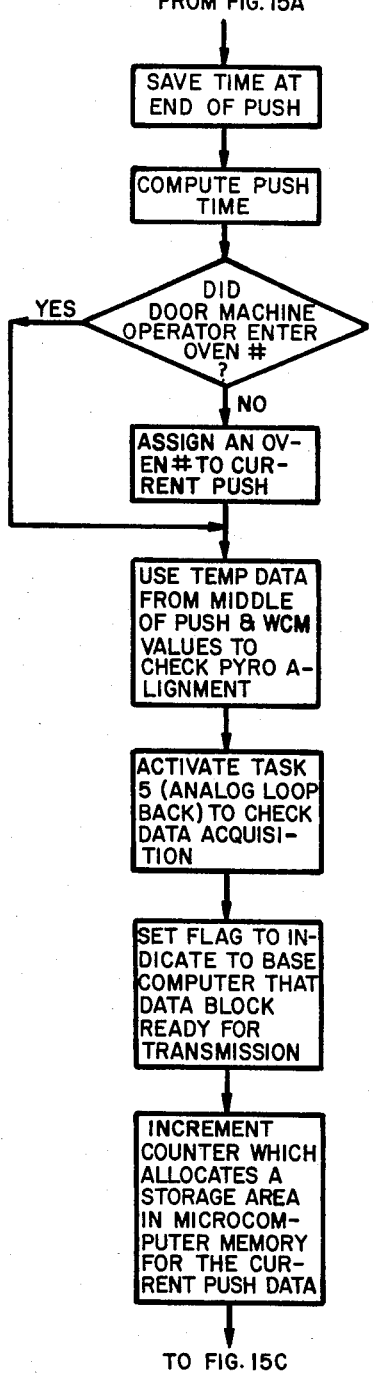
Figure 15C:
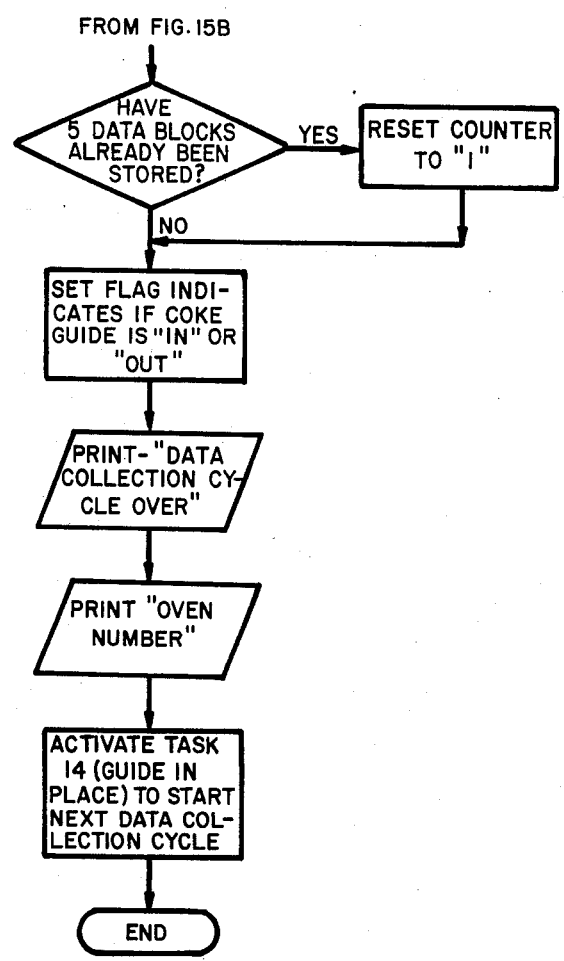

One of the applications programs is step 95 which controls data communications to and from base minicomputer 75 in subsystem 12 in response to operator interaction (FIG. 14,14A). Another is step 96 which calls for automatic coke level and temperature data collection from pyrometer heads 16-1,-2,-3,-4,-5 into storage 69 of microcomputer 50 for use on request from subsystem 12 (FIG. 15,15A,15B,15C).

Figure 16:
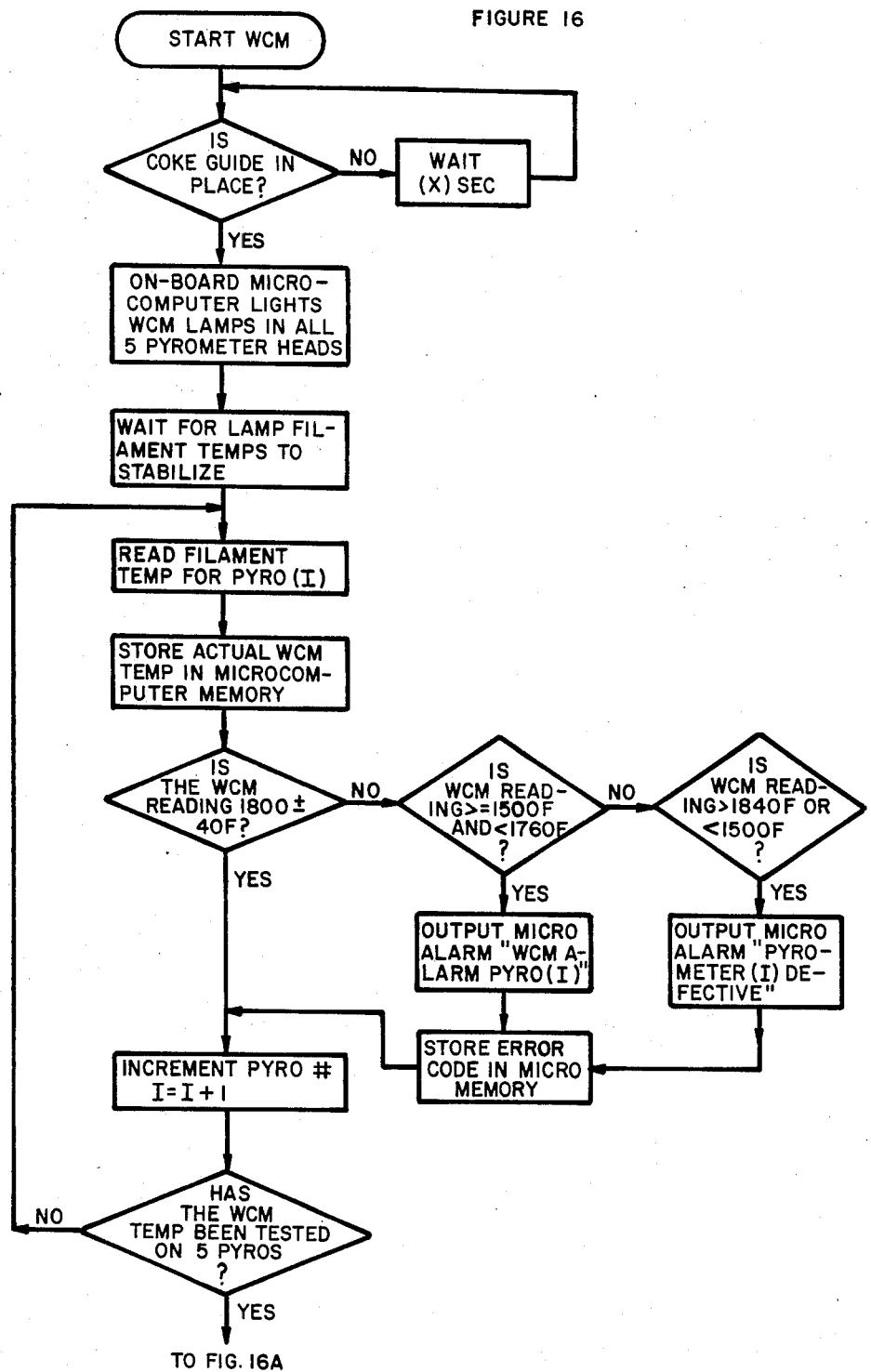
FIGS. 16 and 16A are functional flow charts of a window cleanliness monitor routine.
Figure 16A:
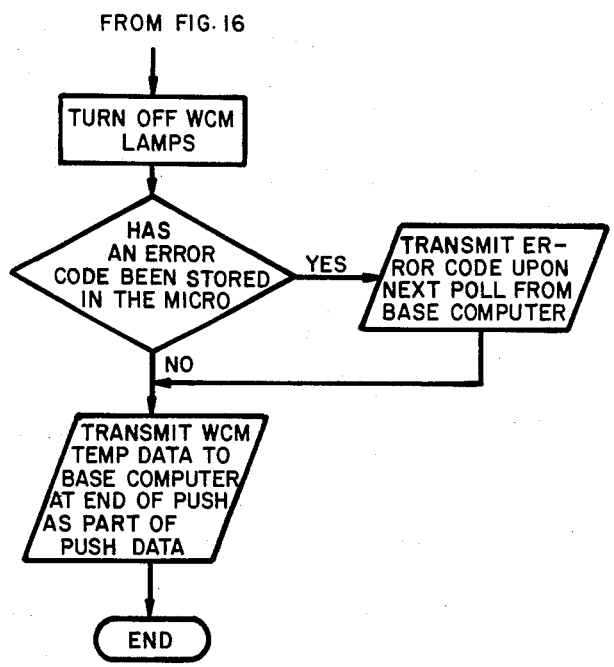

Another application program is step 97 (FIG. 16,16A) which calls for a window cleanliness monitor routine having two parts, namely, part one, window cleanliness and part two, pyrometer alignment. In part one, system errors caused by electronic drift and/or dirt 32 buildup on window 31 are accounted for in the WCM feature which combine hardware and software to compensate for both types of errors as well as alarm personnel when window 31 maintenance is required. WCM details are shown in FIGS. 2 and 3 described above.

Microcomputer 50 will, upon command, generate the monitor light on-off control signal and cause monitor light assembly 39 to cause monitor light to enter pyrometer 23. If the pyrometer window becomes dirty and/or the pyrometer electronics in circuits 47 drift, pyrometer circuits 47 the outputted voltage generated by the WCM monitor light will change.

Each of the five pyrometer heads 16-1,-2,-3,-4,-5, is set to output a voltage equal to a temperature reading of 1800° F. under clean window 31 conditions when the WCM is activated. Before a coke push begins, the WCM is activated, its output voltage checked by the microcomputer, and the data is stored in a "WCM Data Block." These data are analyzed by microcomputer 50 to establish if the pyrometers are functioning properly and whether window 31 cleaning is required. It should be noted, that the tip of fibre optic 40 light guide can also get dirty, but by proper positioning, the rate of dirt buildup on the fibre optic 40 tip matches the rate of buildup on window 31, thereby not impairing the WCM function.

After the WCM data has been obtained and stored in device 69, an analysis of the data is performed sequentially for each of the five pyrometer heads 16-1,-2,-3,-4,-5. Windows 31 are considered to be "clean" if the measured temperature from the WCM light source 39 falls between 1760° and 1820° F. If the reading is less than 1760° F., windows 31 are considered "dirty", however, a check is made to determine if the pyrometer is operating normally before outputting a warning message. Since the pyrometer operating range is from 1500° to 2500° F., the measurement of the WCM light source must exceed 1500° F. to be considered normal pyrometer operation. Thus, if the reading is less than 1760° F. but greater than 1500° F. the pyrometer window is considered "dirty" and a message is output by microcomputer 50 —"WCM ALARM PYRO (I)." Further, if the pyrometer reading is less than 1500° F. or greater than 1820° F., the pyrometer is considered "defective" and a message is output —"PYROMETER (I) DEFECTIVE." After the analysis of the data for pyrometer No. 1, the microcomputer loops back to sequentially test pyrometers 2 through 5. It then returns to the main program.

Messages and printouts of WCM may be obtained onboard by proceeding to steps 98 and 99 when plugging in portable service terminal 68. In addition, this information is logged in base computer subsystem 12 described below.

Figure 18:
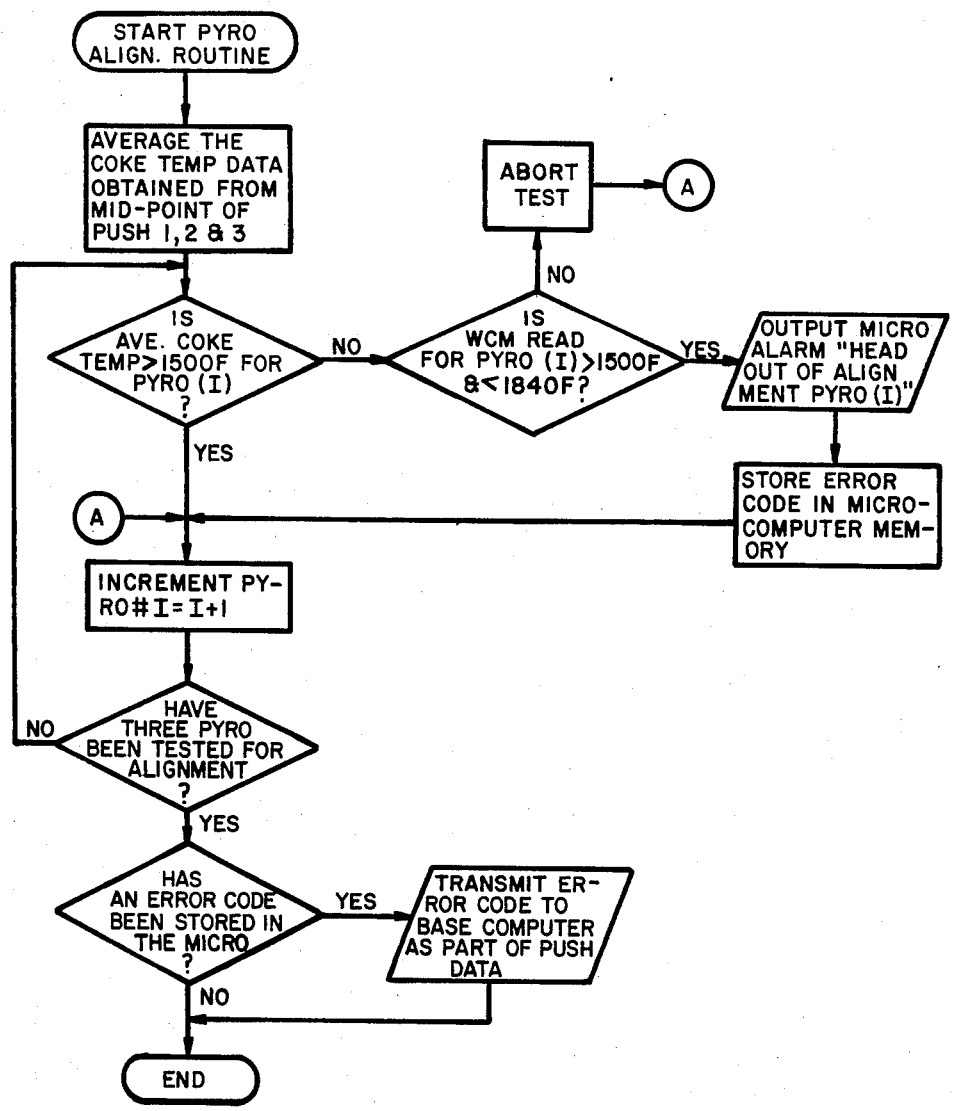
FIG. 18 is a functional flow chart of a pyrometer alignment routine.

As shown in FIG. 18, the second part of step 97 covers the pyrometer head 16-1,-2,-3 alignment check subroutine mentioned above. Proper alignment of pyrometer heads 16-1,-2,-3 with their respective sight tubes 26 is critical because temperature measurement errors would result if the pyrometer were not completely signed on coke mass 13 during a push. Due to the logic involved in establishing pyrometer alignment, this check can only be performed for pyrometer heads 16-1,-2, and -3. Pyrometer heads 16-4 and -5, which monitor the coke line, cannot be evaluated because these pyrometers may not be continuously sighted on coke during a push if the oven had been improperly charged.

Alignment conditions for pyrometer heads 16-1,-2 and -3 are established using the data stored in the WCM data block and the temperature data block. Coke temperature data collected at the mid-point of a push is averaged for each of the three pyrometers and sequentially compared to a temperature of 1500° F. If the average coke temperature for a given pyrometer is greater than 1500° F. but the WCM measurement for that pyrometer is between 1500° and 1820° F. (indicating normal pyrometer operation), the pyrometer is improperly aligned and microcomputer 50 outputs a message —"HEAD OUT OF ALIGNMENT PYRO (I)."

Further, if the measured coke temperature is less than 1500° F. and the WCM output is not in the normal operating range, the test is aborted. A message requesting maintenance assistance would have already been output by the WCM subroutine. After an analysis of the data for pyrometer head 16-1, microcomputer 50 loops back to sequentially test pyrometer heads 16-2 and -3 before returning to the main program.

Messages and printouts of pyrometer head alignment may be obtained onboard by proceeding to steps 98 and 99 when plugging in portable service terminal 68. In addition, this information is logged in base computer subsystem 12 described below.

Figure 17:
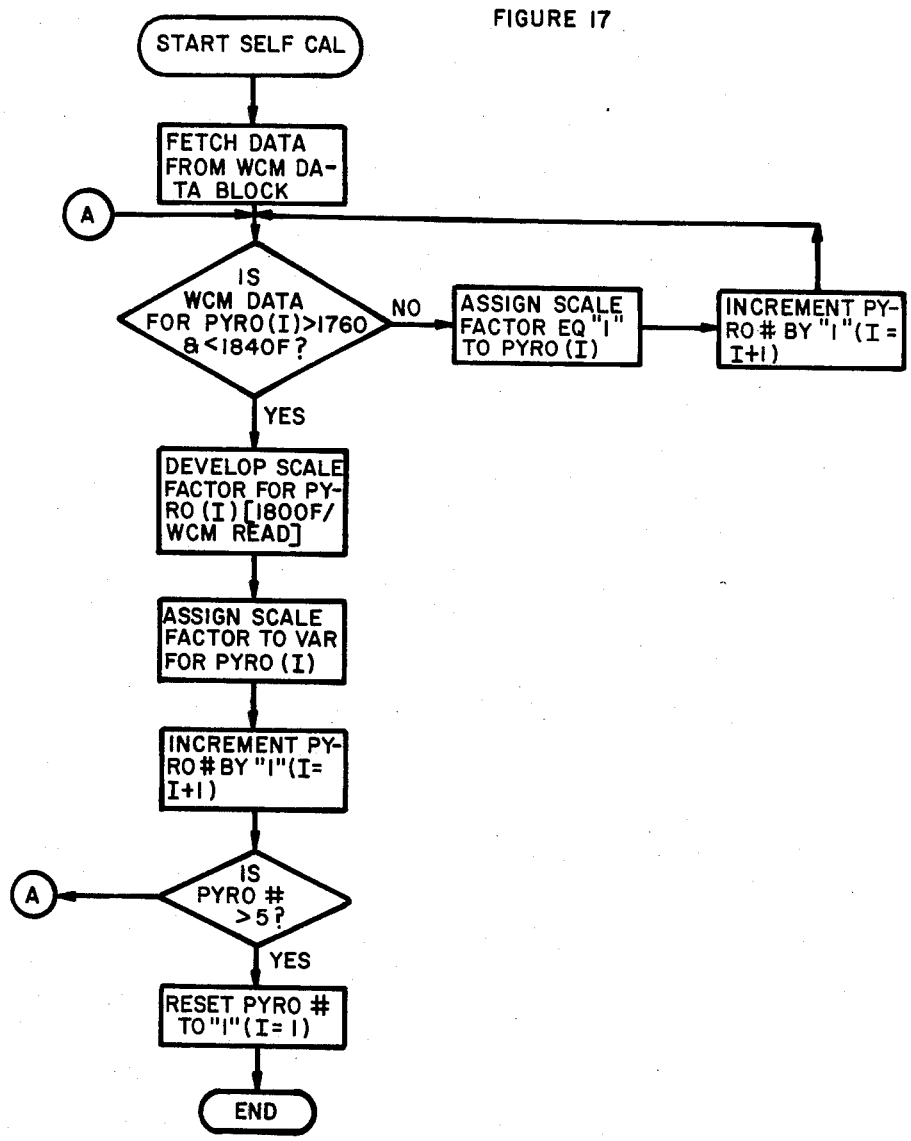
FIG. 17 is a functional flow chart of a self-calibration subroutine.

Subsystem 11 computer programs 70 proceed to another application program, step 100 where subsystem "Self-Calibration" subroutine is performed (FIG. 17).

Dirty pyrometer windows 31 and electronic drift cause errors in the measurement of coke temperature. To minimize these errors, the results of WCM window cleanliness monitor check may be used by microcomputer 50 to automatically adjust the pyrometer head 16-1,-2,-3,-4,-5 calibration.

This "Self-Calibration" subroutine initially fetches the data located in the WCM data block and checks whether the WCM reading for a particular pyrometer head 16-1,-2,-3,-4,-5 falls within an acceptable operating range from 1760° to 820° F. If it is within the normal range, the WCM reading is then divided into 1800° F. (the original pyrometer output when sighted through a clean window on the WCM lamp 39) to develop a "Scale Factor" for that pyrometer. This scale factor is approximately linear for small variations of the WCM reading near 1800° F. All temperature data subsequently collected with that pyrometer is then "adjusted" by multiplying the temperature data by the scale factor. Thus, as the window gets dirty, or other slowly varying functions change, the increased or decreased temperature measurement sensitivity is automatically compensated for.

If the WCM data for a given pyrometer head 16-1,-2,-3,-4,-5, is outside the preselected normal operating range, the WCM subroutine (previously run in step 90 will have already output a message for maintenance assistance). Temperature data provided by that pyrometer is then multiplied by a scale factor equal to 1.0 which outputs these data as collected. Finally, a message is output along with the data which indicates whether the data was adjusted and the scale factor used. Microcomputer 50 sequentially checks the remaining pyrometers before returning to the main program.

Still another applications program is performed in step 101 where subsystem 11 "Self-Diagnostics" subroutine is performed covering three different parts and five subparts of one of the parts.

Figure 19:
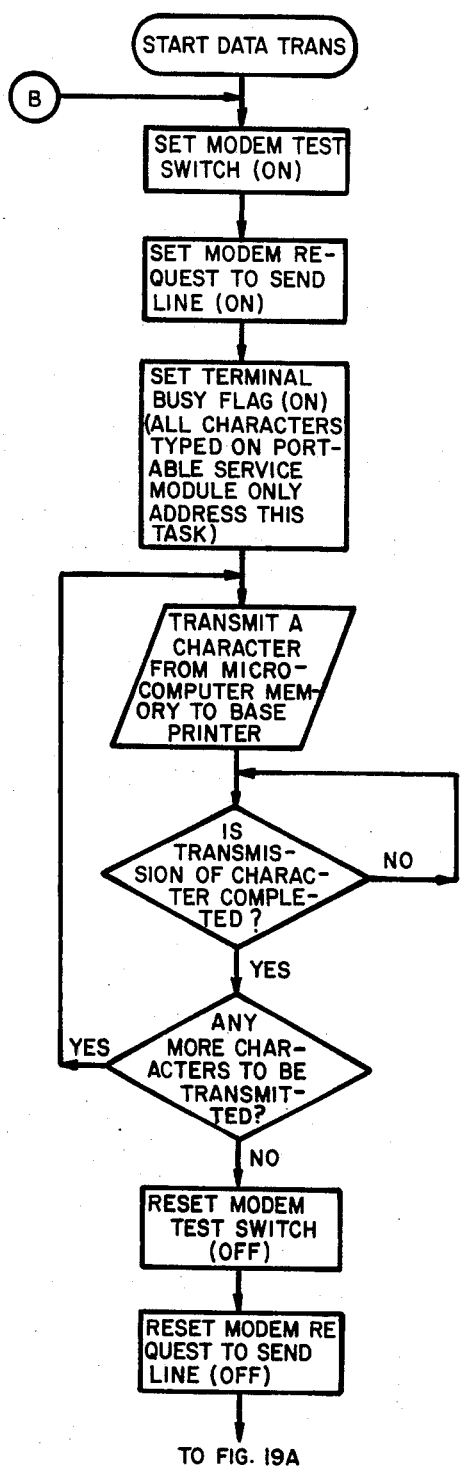
FIGS. 19 and 19A are functional flow charts of data transmission operations routine.
Figure 19A:
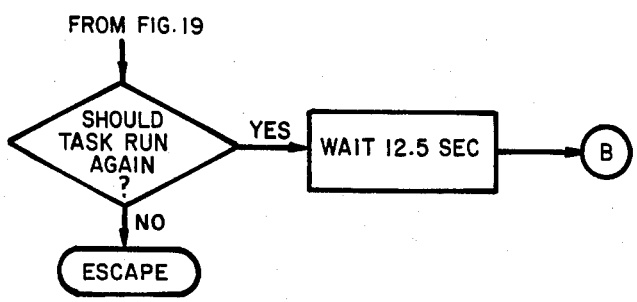
Figure 20:
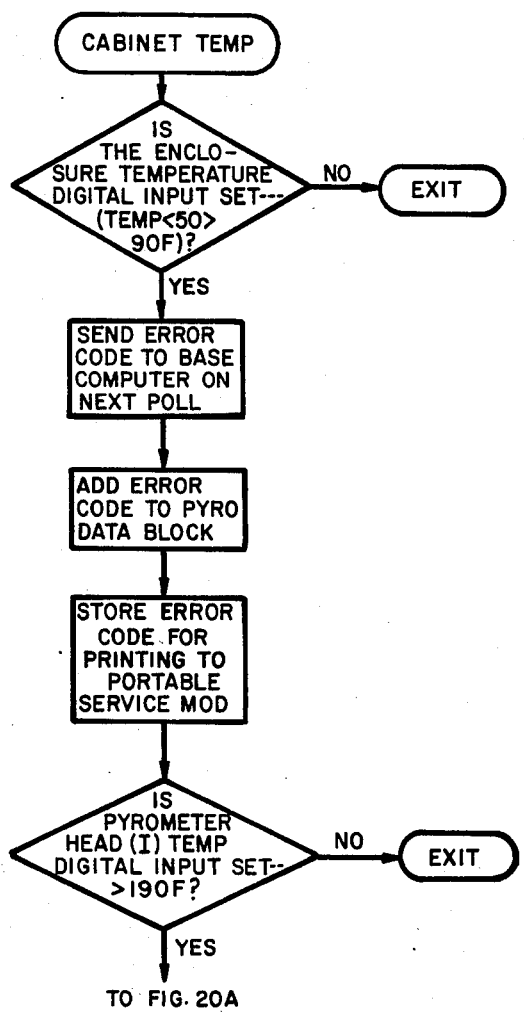
FIGS. 20 and 20A are functional flow charts of a cabinet temperature diagnostic subroutine.
Figure 20A:
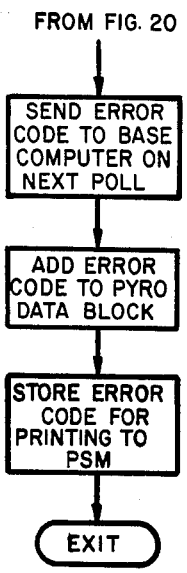
Figure 21:
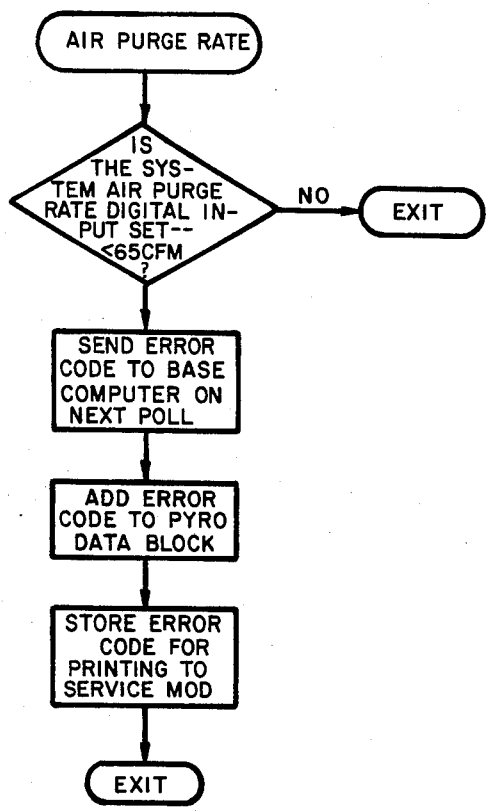
FIG. 21 is a functional flow chart of an air purge flow rate diagnostic subroutine.
Figure 22:
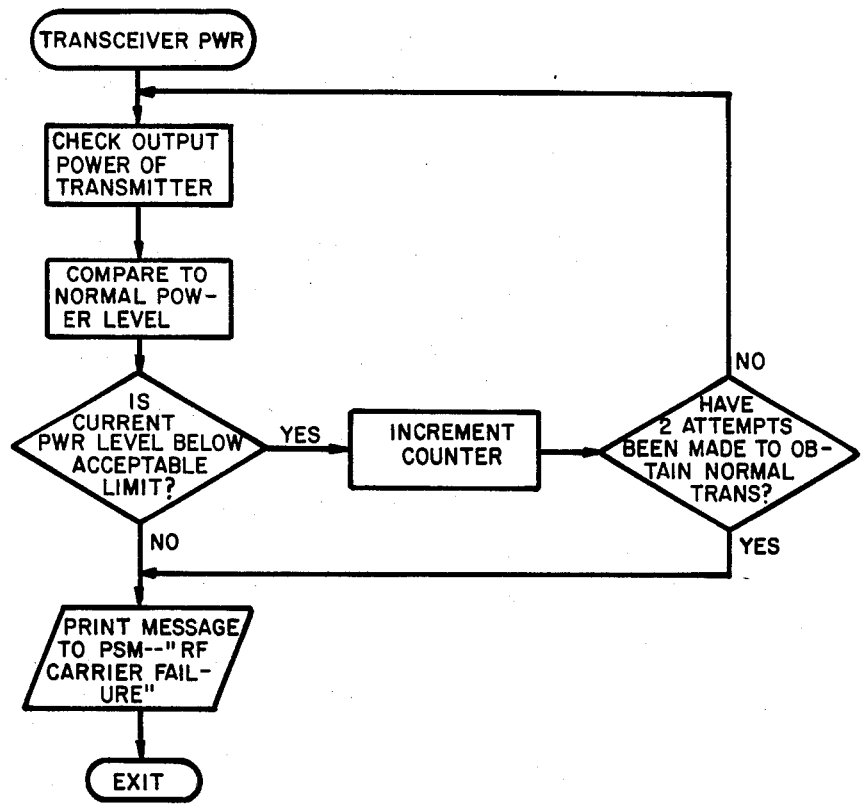
FIG. 22 is a functional flow chart of a transceiver power level diagnostic subroutine.
Figure 23:
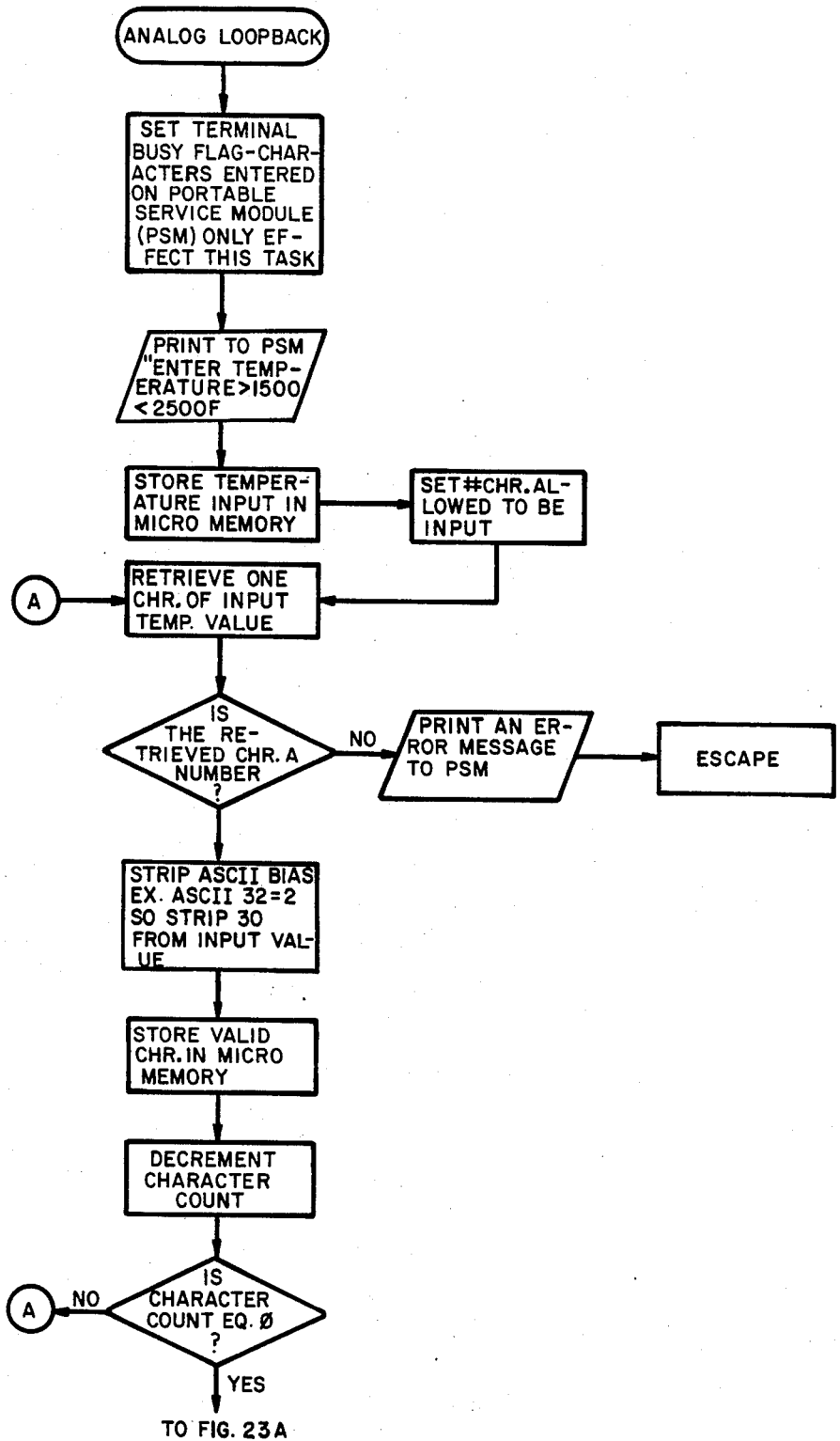
FIGS. 23 and 23A are functional flow charts of analog loopback data acquisition check.
Figure 23A:
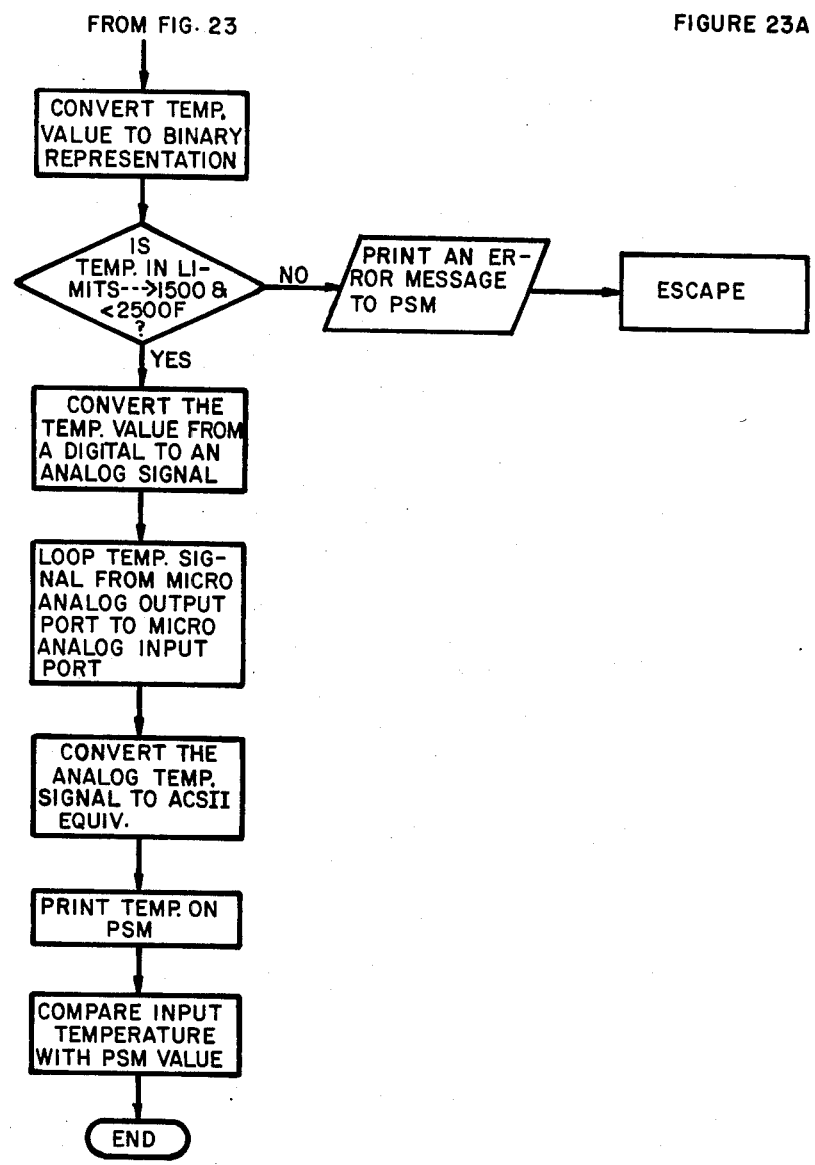
Figure 24:
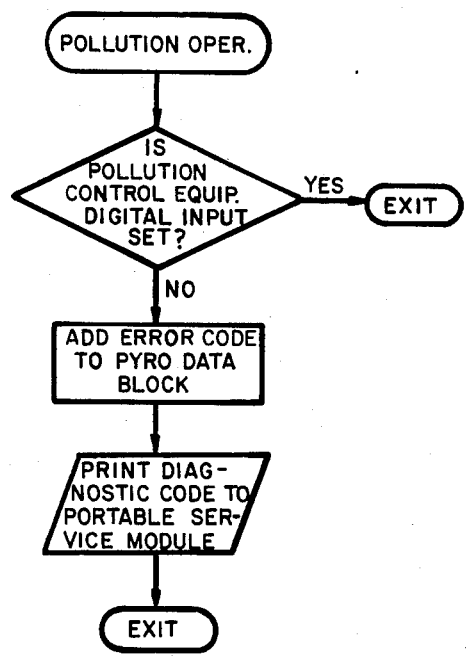
FIG. 24 is a functional flow chart of a pollution operation diagnostic subroutine.

In "Self-Diagnostics" subroutine, step 101, operation of the subsystem 11 is made more reliable through the use of self-diagnostics which are performed automatically by microcomputer 50. During each coke 13 push cycle, microcomputer 50 checks the following substep parameters to assure normal equipment operation:

1. Pyrometer Operation—checks pyrometer head alignment status of each pyrometer head 16-1,-2,-3 with their respective sight tubes 26 as described above in the second part of step 97 (FIG. 18).
2. Data transmission operations (FIG. 19,19A).
3. System parameters operations, including sensor diagnostics subroutine:
   .1 Main cabinet temperature of pyrometer heads 16-1,-2,-3,-4,-5 and equipment enclosure 17 (FIG. 20,20A),
   .2 Air purge flow rate (FIG. 21),
   .3 Transceiver power of radio link 72—checks the RF power level to assure proper strength for accurate transmission of data (FIG. 22),
   .4 Data acquisition—checks microcomputer 50 data acquisition by simulating pyrometer input at device 51 of known temperature and inputting same into microcomputer 50 for analysis (FIG. 23,23A),
   .5 Pollution operation—checks operational features of pollution equipment associated with coke side equipment as determined by state of machine control relays 64 (FIG. 24).

To minimize equipment operating problems "Sensor Diagnostics" subroutine provides a way to check the status of the air purge system 19, as well as the temperature of both the main enclosure 17 and pyrometer heads 16-1,-2,-3,-4,-5 enclosures. The air purge system serves two functions: (1) cooling of the pyrometer head enclosures maintain their inside temperature below the rated ambient temperature (180° F.) of the pyrometer and (2) purging of the pyrometer windows 31 to minimize dirt buildup on the windows. Due to high temperature and heavy dust conditions prevailing during a coke oven push, it is necessary to continuously monitor the air purge rate and the temperature of the enclosures to provide reliable system operation.

The temperature of the main enclosure 17 is also monitored to assure that the onboard electronics is operating in the desired temperature range of 50° to 90° F. Temperature extremes in either direction could cause the electronics to drift resulting in measurement errors.

After the "Sensor Diagnostics Subroutine" is called, all software flags (indicating the presence of diagnostic errors) which were set during the previous push are cleared. Microcomputer 50 then sequentially checks the following:

1. Air Purge Rate—An air flow switch 60 monitors the air purge rate to the pyrometer head enclosures. Should the air purge rate fall below 6 cfm, the flow with provides a contact closure output to microcomputer 50 which sets a flag. Microcomputer 50 then sends a message to the base computer subsystem 12 during its normal real-time polling indicating an air-purge failure.
2. Temperature to the main electronics enclosure 17—A thermostat monitors the temperature of the main electronics enclosure 17. Should the temperature of the enclosure fall outside the range from 50° to 90° F., the thermostat provides an output to the microcomputer which sets a flag. As above, microcomputer 50 sends a message to the base computer subsystem 12 indicating a temperature problem in the main electronics cabinet.
3. Temperature of the five pyrometer head 16-1,-2,-3,4,-5 enclosures - thermal switches monitor the temperature of these pyrometer head enclosures. Should the temperature of the enclosures exceed 190° F., the thermal switches provide a contact closure output to microcomputer 50 which then sets a flag. A message is sent to the base computer sub- system 12 indicating the specific enclosure which exceeds the desired operating temperature range.

After the sensor diagnostics routines, microcomputer 50 returns to the main program.

AN "RF Sniffer" subroutine follows. Transmission of data and messages between the coke guide 14/door machine 15 and base computer subsystem 12 is done by an RF transceiver 72. To reliably transmit these data, the RF transmitter power must exceed a preset level. An RF Sniffer monitors the output power of the transmitter during regular operation as follows: Microcomputer 50 checks the sniffer output and, if the power level is low, will check the sniffer output again. A failure of both tests prompts the microcomputer to set a local message "RF Carrier Failure."

A "Data Acquisition Diagnostic" subroutine follows. The "Data Acquisition Diagnostic" subroutine provides a method to automatically check the operation of the data acquisition section of the onboard microcomputer. "Data Acquisition Diagnostic" subroutine provides the following steps.

1. Under microcomputer 50 control, a digital number is generated which is equivalent to a temperature of 1800° F. Alternatively, it is possible to manually input a value corresponding to a temperature between 1500° and 2500° F.
2. The digital signal is converted to an analog signal by microcomputer 50 digital to analog converter.
3. The analog signal is transmitted from the microcomputers output port back into its input port such as those used for the pyrometer inputs.
4. The analog signal is reconverted to a digital temperature value.
5. The temperature reading is displayed.

If the output temperature value is within ±5° F. of the known input value, the data acquisition section of microcomputer 50 is working properly and the microcomputer returns to the main program. If an error occurs, a flag is set and a message "Data Acquisition Failure" is transmitted to base computer subsystem 12.

Messages and printouts of self-diagnostics may be obtain onboard by proceeding to steps 98 and 99 when plugging in portable service terminal 68. In addition, this information is logged in base computer subsystem 12 described below.

Onboard microcomputer 50 also performs step 102 which calls for formatting data to the specific oven that was pushed according to the oven push schedule. This subroutine returns to the main program, then may proceed to step 98 and 99 described above for use of the messages and printouts provided.

The final step in onboard microcomputer 50 programming is step 103 where temporary data storage is updated for each of the five pushes placed in storage 69, then returns to the main program.

Printouts by portable service terminal 68 when plugged into onboard subsystem 11, in step 98, are exemplified in FIGS. 5, 6 and 7. FIG. 5 is a typical heading printed on a sheet which is self-explanatory. The diagnostic codes are showing FIG. 7. FIG. 6 shows a typical tabular printout of raw coke temperature data for a selected oven where window cleanliness temperature measurements are obtained before the push is started and when WCM light control signal was "on." Pyrometer head 16-4 has a low WCM reading indicating a dirty window. The second and subsequent pyrometer head reading of coke temperature appear in columns under the WCM temperature which tabulated from intervals 1 to 47 when WCM light control signal was "off."

FIG. 7 shows a typical printout of the self-diagnostic features of subsystem 11 with the heading listing for "Help Task," followed by a listing of "Tasks Available for Operator" which are self-explanatory. Below is a heading "Diagnostic," under which each of the diagnostic code numbers that will be printed, for example, in the heading shown in FIG. 5. Otherwise the same Help Tasks are transmitted to and used in base computer subsystem 12.

Referring now to base computer subsystem 12, a summary of operations follows relative computer programs 78 shown in FIG. 8 steps 110 to 123 covering various subroutines. At the command of minicomputer 75 located in a central office the onboard microcomputer 50 aids in transmitting the data, via an RF transceiver 73, to minicomputer 75. The minicomputer 75 checks the data validity, processes the data, outputs graphs of the coke line (height of coke in the oven) and the vertical and horizontal temperature variations within an oven, develops summary management and maintenance reports, stores data for up to 600 pushes, and reports any diagnostic system problems. See FIGS. 9-13. These data can be used by operating personnel to prioritize coke oven maintenance, establish the heating practices of the coke oven battery and monitor the efficiency of the coal charging operation.

Figure 25:
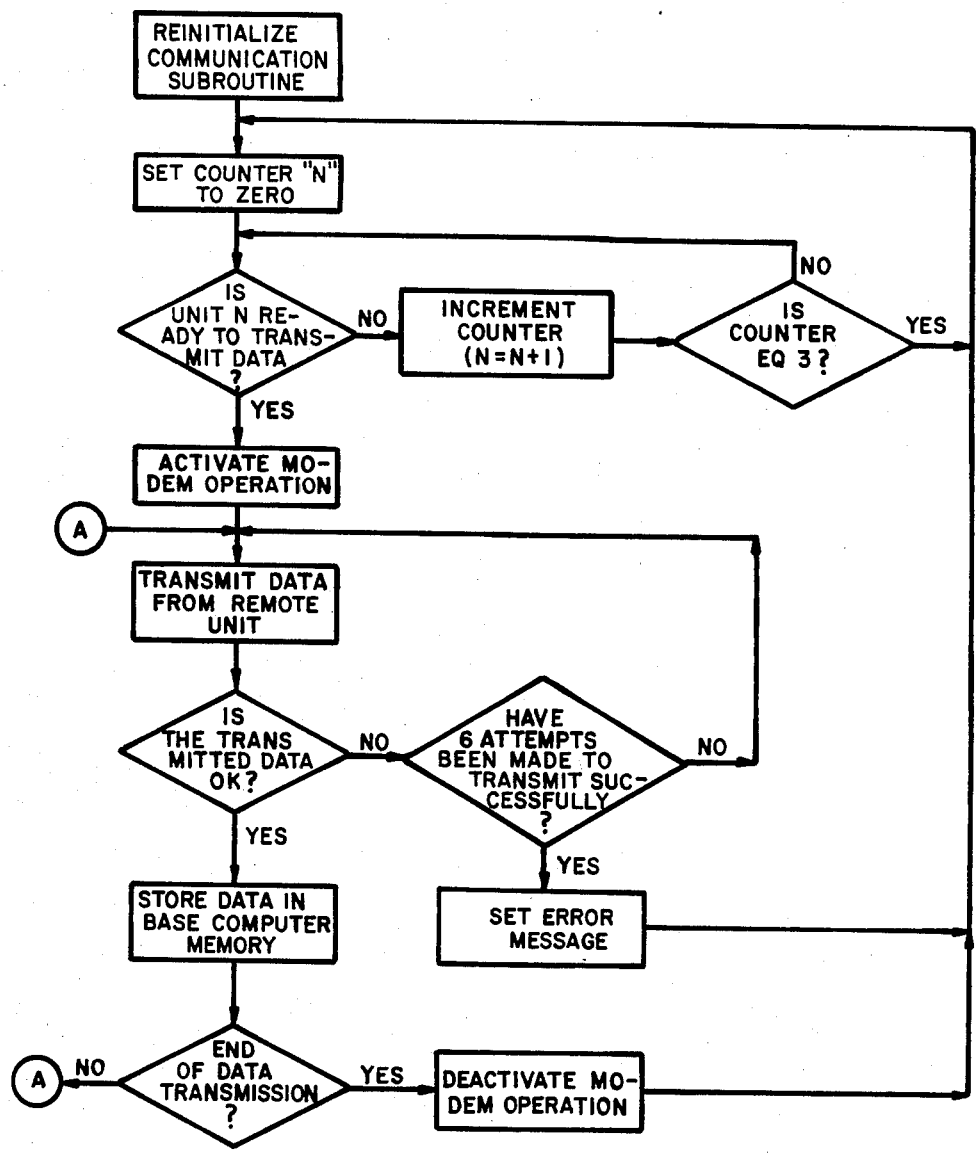
FIG. 25 is a functional flow chart of a communications subroutine for base minicomputer.
Figure 26:
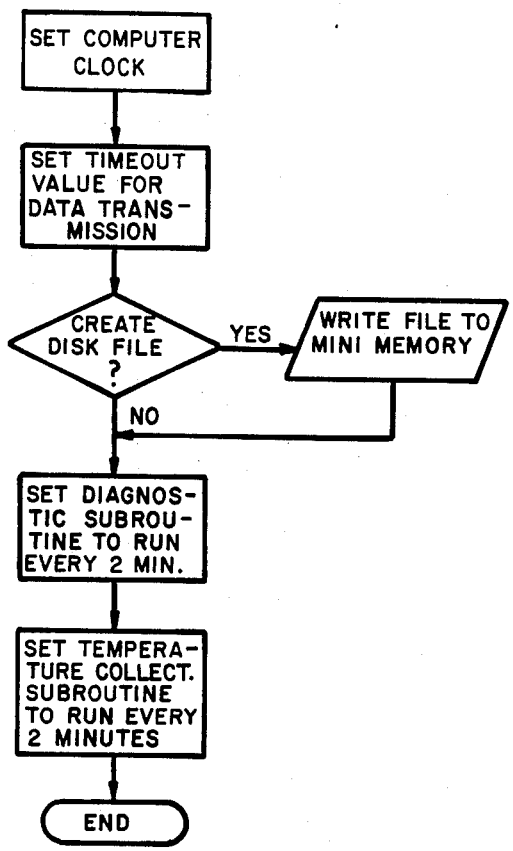
FIG. 26 is a functional flow chart of initialization programs for communications subroutine for base minicomputer.
Figure 27:
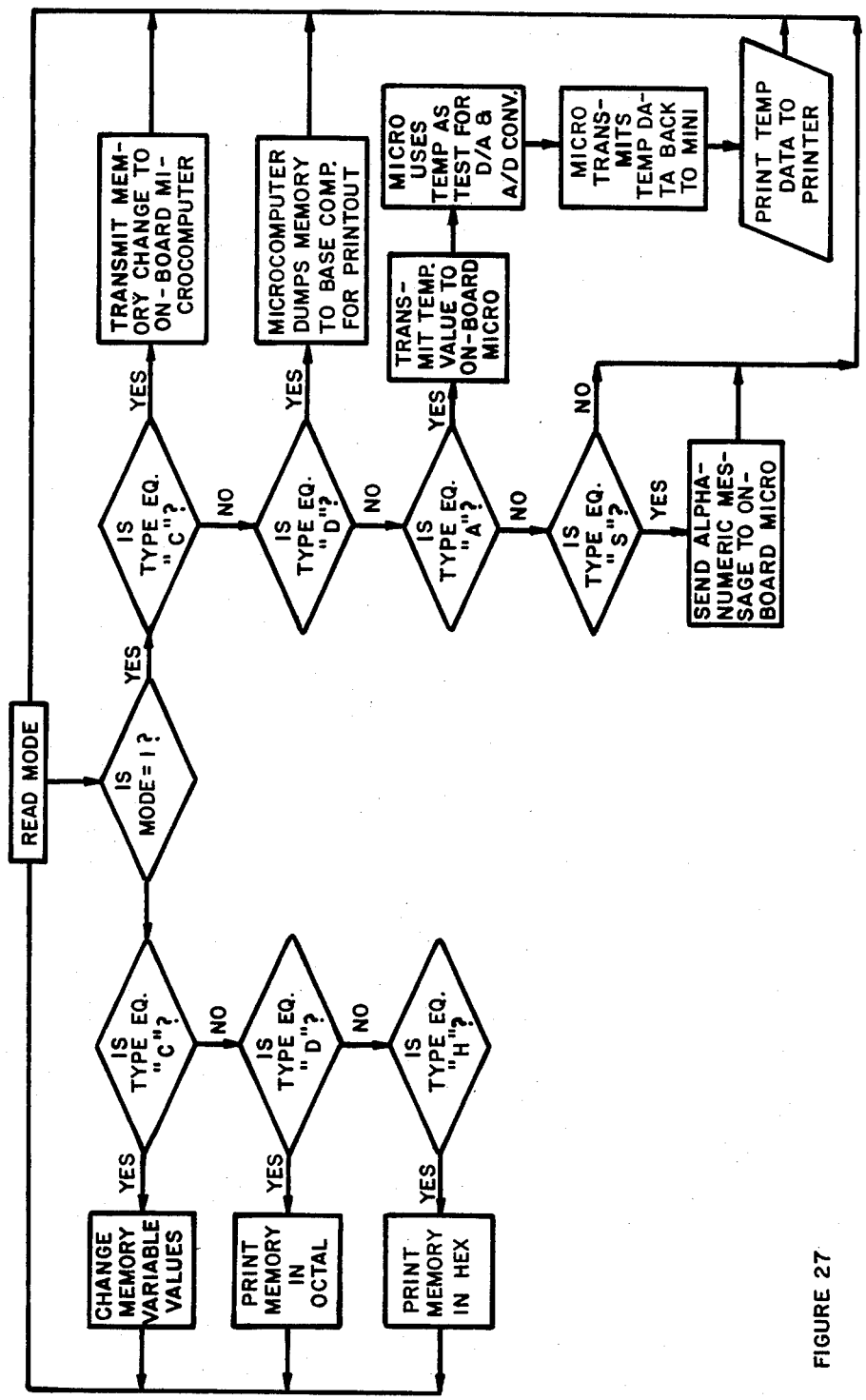
FIG. 27 is a functional flow chart of utility programs for base minicomputer.

Base computer subsystem 12 minicomputer 75 operating system executive subroutine is called for in step 110. This is followed by communications programs for radio line 73 called for in step 111 and modem 74 interface programs called for in step 112 (FIG. 25), both step responsive to operator interaction at terminal 81 to control passage to and from subsystem 11 of all data through the entire two-way data communications radio links. Step 113 (FIG. 26) calls for initialization programs and step 114 (FIG. 27) calls for utility programs core, both in response to step 10.

Figure 28:
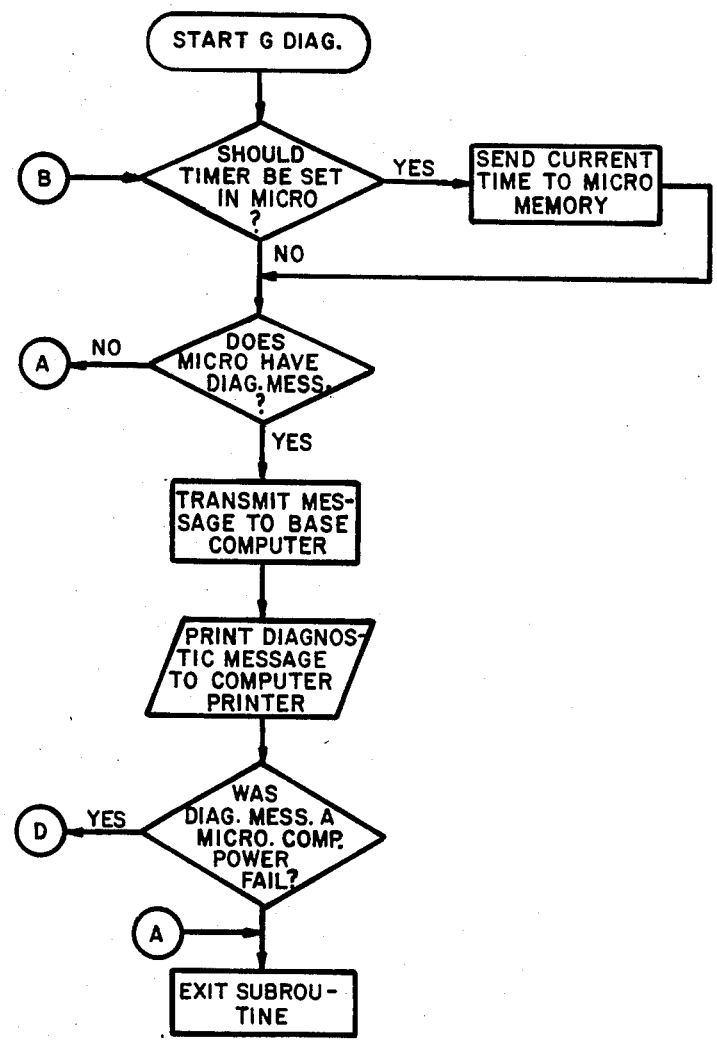
FIG. 28 is a functional flow chart of a subroutine for automatically obtaining diagnostic messages from onboard microcomputer.

After initializing step 113, there is applications program step 115 which covers simultaneously three essential automatic applications programs in steps 116, 118 and 119. Step 116 (FIG. 28) calls for a subroutine which automatically gets diagnostic messages from onboard microcomputer 50 obtained as mentioned above, then step 117 (FIG. 28) calls for printing these diagnostic messages on line printer 82. This subroutine then returns to the main program.

Figure 29:
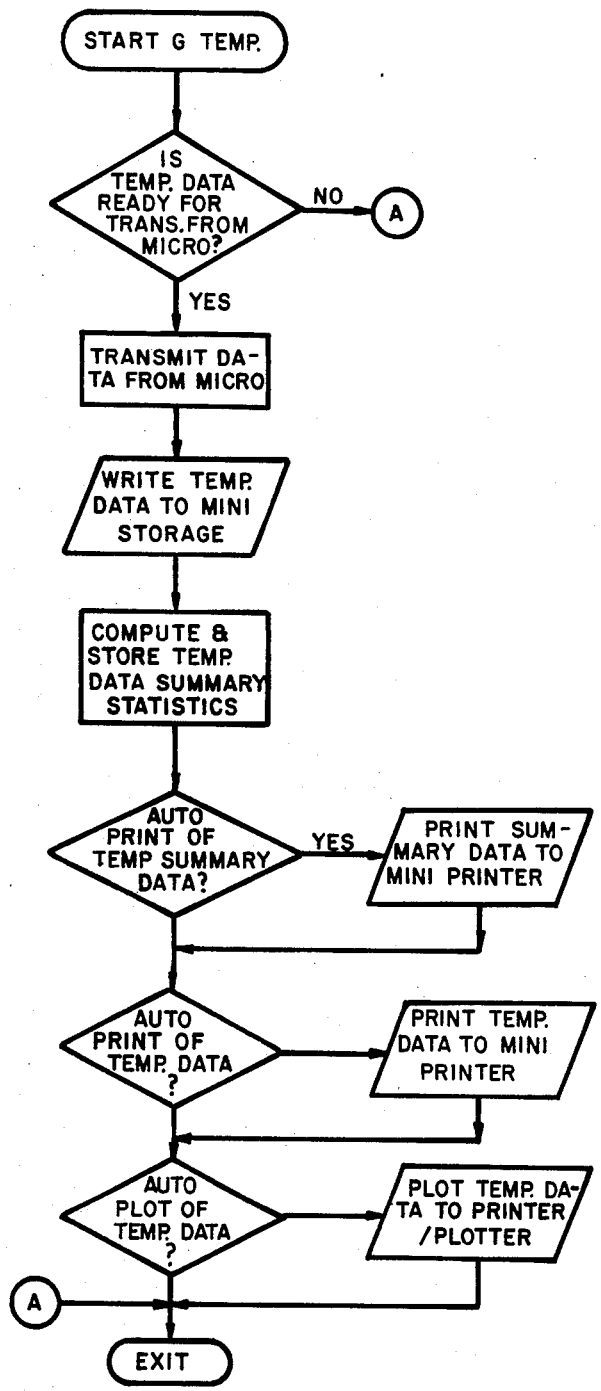
FIG. 29 is a functional flow chart of a subroutine for automatically getting and storing temperature data from onboard microcomputer.

Step 118 (FIG. 29) calls for a subroutine which initially automatically gets coke temperature data from onboard microcomputer 50, obtained as mentioned above, then later stores in short-term storage 76 coke temperature data for approximately 600 coke oven pushes identified from a coke oven pushing schedule stored in minicomputer 75 from data generated by device 67 in subsystem 11. Data acquisition portion of this subroutine loops back to step 115, and the storage portion of this subroutine exits to step 119.

Figure 30:
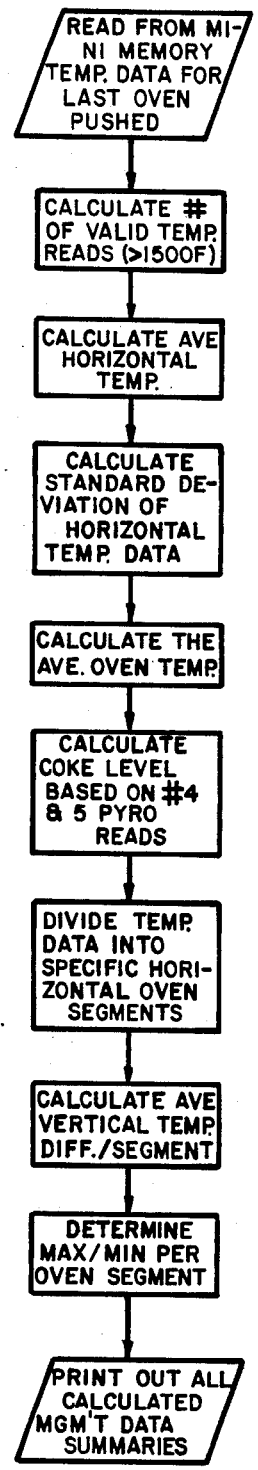
FIG. 30 is a functional flow chart of a subroutine for automatically computing and analyzing coke line and temperature data.

Step 119 (FIG. 30) calls for a subroutine which automatically computes data, obtained as mentioned above, and performs the following analyses:
1. Coke line and coke temperature analysis, per oven and battery based on the coke oven pushing schedule stored in minicomputer 75,
2. Summary data for management, maintenance and operating personnel.

When computation portion of this subroutine is complete it loops back to step 115. However, the later portion of step 119 subroutine calls for storing summary data in long term storage 77 for historical use, then exiting same to step 120.

Figure 31:
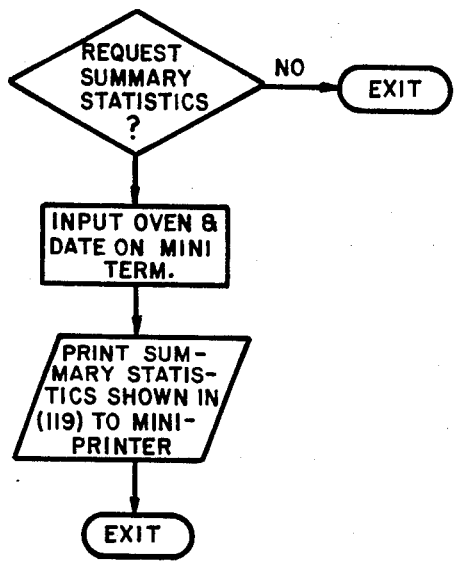
FIG. 31 is a functional flow chart of a summary printing subroutine.
Figure 32:
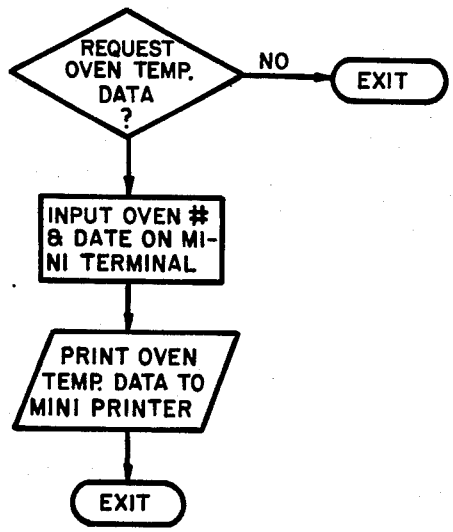
FIG. 32 is a functional flow chart of a printing subroutine for coke line and temperature data.

Step 120 calls for a subroutine which accommodates operator interface requests through terminal 81 to obtain any of the stored data and present it in any of three ways called for in steps 121, 122, 123. One is by step 121 (FIG. 31) subroutine which calls for printing summary statistics on line printer 82 of the like appearing in FIG. 12 base minicomputer push schedule output and others not shown. This subroutine loops back to step 120. A second is by step 122 (FIG. 32) subroutine which calls for printing tabular data on line printer 82 of coke line and vertical and horizontal oven temperature data substantially similar to that of FIG. 6 under a data dump task. This subroutine loops back to step 120.

Figure 33:
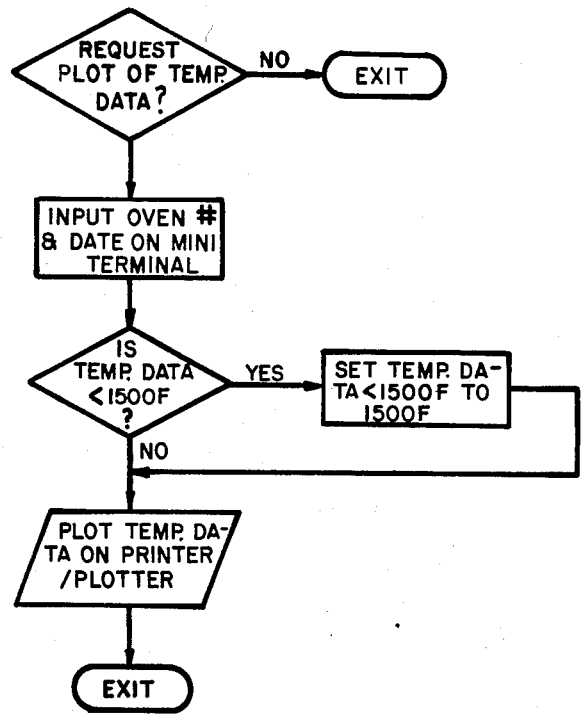
FIG. 33 is a functional flow chart of a graphical display subroutine.

Step 123 (FIG. 33) called for a subroutine which will plot graphical displays on printer/plotter 83 of coke line and vertical and horizontal coke temperature data of the like appearing in FIGS. 9 and 10A to 10D.

FIG. 9 illustrates horizontal coke temperature profile plots at each of the five levels of pyrometer heads 16-1,-2,-3,-4,-5 above the selected coke oven sole, or floor, according to the legend in the upper right-hand corner. Five-point vertical temperature profile of the coke mass may easily be obtained from the five different coke temperature traces by observing data points at any vertical line along the length of the selected oven. Coke level profile may be observed by the temperature trace of the highest level pyrometer head 16-5. FIG. 9 also shows a plot of an irregularly filled and leveled coal charge, as indicated by the absence of temperature measured by the pyrometer head at the 18 foot level.

FIGS. 10A to 10D are similar plots of the FIG. 9 coke temperature data exemplifying the coke level and temperature data of the same oven in four successive charging and coking cycles in the same battery of coke ovens. Step 123 subroutine loops back to step 120, thus completing the description of computer program 78 of the base computer subsystem 12, as well as the entire system 10.

We claim:

1. A system for determining temperature as an irradiant mass movable through process means located in a hostile environment, comprising:
 (a) means for measuring irradiant mass temperature with a sensor aimed at said mass through a sighting window and adjacent sighting space and producing a mass temperature signal, said signal varying proportional to mass temperature and an optical error caused by environmental matter affecting the sighting window and possibly said space;

(b) means for monitoring sighting window and space for cleanliness with a monitor light source which passes monitor light through the sighting space and window and into the sensor;

(c) means for generating a monitor light control signal to turn said light on and off respectively before mass movement starts through the process means:

(d) computer means for detecting the optical error portion of the mass temperature signal by comparing actual sensor response to the monitor light source with the signal obtained from said light source for a clean window:

(e) computer means for processing the detected optical error data to obtain and store a correction factor based on first and second sensor measurements made in response to the monitor on-off control signal, respectively, said correction factor used to produce a corrected mass temperature data;

(f) means for generating a digital timing signal related to mass movement; and (g) means for displaying in synchronization with the digital timing signal a sequence of the first sensor temperature data uncorrected, followed by the second and subsequent sensor temperature data as corrected mass temperature measured during mass movement.

2. A system for determining temperature profile of an irradiant mass movable horizontally through a vertical opening in process means located in a hostile environment, comprising:

(a) means for measuring plural irradiant mass temperatures with plural sensors aimed at different vertical levels of the mass through separate sighting windows and adjacent sighting space and each producing one of plural mass temperature signals, each said signal varying proportional to mass temperature at its different level and a corresponding optical error, each optical error caused by environmental matter capable of affecting each sighting window and possibly said space in a different manner at each level;

(b) means for monitoring plural sighting windows and said space for cleanliness with plural monitor light sources, each source passing monitor light through sighting space and window and into a different one of the plural sensors:

(c) means for detecting each optical error data portion of the plural mass temperature signals by comparing each actual sensor response to the respective monitor light source with the signal obtained from said light source for a clean window: and (d) means for utilizing the plural optical error data to determine the correct mass temperature signal at a corresponding mass level.

3. The system of claim 2 wherein means (a) said mass temperature signal is also subject to drift error variations caused by mass temperature sensor ambient heat variations, further including means for detecting the drift error data portion of the temperature signal by sensing the mass temperature sensor ambient temperature, and means (d) compensating the temperature signal accordingly.

4. The system of claim 2 wherein means (c) for detecting each comparison is made in response to a monitor light control signal generated by means (f) to turn each said light on and off respectively before mass movement starts through the process means.

5. The system of claim 4 wherein means (d) includes computer means directed to processing each detected optical error date to obtain and store a corresponding correction factor based on window cleanliness measurements made by each of the plural sensors when their associated monitor light is turned on and off, respectively, each said correction factor used to produce one of plural corrected mass temperature signals.

6. The system of claim 5 wherein means (d) computer means is directed to additional processing of each mass temperature, and further including means for displaying in separate sequences each of the plural first sensor measured temperature signal uncorrected followed by each of the plural second and subsequent sensor measurement temperature signals as corrected mass temperature at its corresponding level effectively during mass movement.

7. The system of claim 6 further including means for generating a digital timing signal related to mass movement and the step of displaying is synchronized with the timing signal so as to display a separate sequence of each said mass temperature measurements.

8. A system for determining temperature profile of an irradiant mass movable horizontally through a vertical opening in process means located in a hostile environment, which comprises:

(a) means for measuring plural irradiant mass temperatures with plural sensors aimed at different vertical levels of the mass through separate sighting windows and adjacent sighting space and each producing one of plural mass temperature signals, each said signal varying proportional to mass temperature at its different level and a corresponding optical error, each optical error caused by environmental matter capable of affecting each sighting window and possibly said space in a different manner at each level;

(b) means for monitoring plural sighting windows and said space for cleanliness with plural monitor light sources, each source passing monitor light through sighting space and window and into a different one of the plural sensors;

(c) means for generating a monitor light control signal to turn each said light on and off respectively before mass movement starts through the process means:

(d) means for detecting each optical error data portion of the plural mass temperature signals by comparing in response to the light control signal each actual sensor response to the respective monitor light source with signal obtained from said light source for a clean window:

(e) computer means for processing each detected optical error data to obtain and store a corresponding correction factor based on first and second measurements made by a different one of the plural sensors with their associated monitor light turned on and off, respectively, each said correction factor used to produce one of plural corrected mass temperature signals;

(f) means for generating a digital timing signal related to mass movement; and (g) means for displaying in synchronism with digital timing signal separate sequences each of the plural first sensor measured temperature signal uncorrected, followed by each of the plural second and subsequent mass temperature at its corresponding level during mass movement.

9. The system of claim 8 further including computer means for processing the corrected temperature data and means for displaying a horizontal temperature record of an irradiant mass relative mass movement through the processing means.

10. The system of claim 8 wherein the computer means includes a first computer for processing raw mass temperature data at one location and transmitting such data to a second computer at another location for further processing analysis and preparation of display records, and further means for displaying such records at a location including that of either location.

* * * * *